US009782726B2

(12) United States Patent
Seibert et al.

(10) Patent No.: US 9,782,726 B2
(45) Date of Patent: *Oct. 10, 2017

(54) NON-DISPERSIVE PROCESS FOR OIL RECOVERY

(71) Applicants: Board of Regents, The University of Texas System, Austn, TX (US); Organic Fuels Algae Technologies, LLC, Houston, TX (US)

(72) Inventors: Frank Seibert, Austin, TX (US); Stacy S. Truscott, Austin, TX (US); Stephen William Briggs, Austin, TX (US); Peter B. Kipp, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 782 days.

This patent is subject to a terminal disclaimer.

(21) Appl. No.: 13/918,766

(22) Filed: Jun. 14, 2013

(65) Prior Publication Data

US 2013/0270187 A1 Oct. 17, 2013

Related U.S. Application Data

(63) Continuation-in-part of application No. 13/358,897, filed on Jan. 26, 2012, now Pat. No. 8,491,792, which (Continued)

(51) Int. Cl.
*B01D 39/00* (2006.01)
*B01D 63/02* (2006.01)

(Continued)

(52) U.S. Cl.
CPC ........... *B01D 63/02* (2013.01); *B01D 17/045* (2013.01); *C10G 1/002* (2013.01); *C10G 1/04* (2013.01);

(Continued)

(58) Field of Classification Search
CPC .. B01D 2311/04; B01D 63/02; B01D 61/246; B01D 17/045; B01D 61/00;

(Continued)

(56) References Cited

U.S. PATENT DOCUMENTS

| 2,611,490 A | 9/1952 | Robinson |
| 3,956,112 A | 5/1976 | Lee et al. |
| 4,309,289 A * | 1/1982 | Head ................... B01D 17/045 |
| | | 210/488 |
| 4,439,629 A | 3/1984 | Ruegg |
| 4,814,088 A | 3/1989 | Kutowy et al. |
| 4,933,198 A | 6/1990 | Lee et al. |
| 4,966,707 A | 10/1990 | Cussler et al. |
| 5,078,886 A | 1/1992 | Hsu |
| 5,107,056 A | 4/1992 | Chen et al. |
| 5,167,824 A | 12/1992 | Cohen et al. |

(Continued)

FOREIGN PATENT DOCUMENTS

| CA | 2248280 A1 | 10/1998 |
| EP | 0554567 A1 | 8/1993 |

(Continued)

OTHER PUBLICATIONS

European Patent Office, Extended European Search Report for European Patent Appl. No. 11733393.0 (PCT/US2011021185) dated Sep. 16, 2015. 8 pp.

(Continued)

*Primary Examiner* — Ana Fortuna
(74) *Attorney, Agent, or Firm* — Kilpatrick Townsend & Stockton LLP

(57) ABSTRACT

A method of recovering one or more insoluble oils from a liquid source using one or more membrane or membrane contactors, comprising the steps of: pumping the liquid source comprising the one or more oils to the membranes or membrane contactors, contacting the liquid source with a first surface of the membrane or membrane contactors, coalescing the one or more oils within the liquid source onto the first surface of the membrane contactors, pumping one or more recovery fluids through the membrane or membrane contactors in contact with the second surface of the membrane or membrane contactors, and removing a first stream of oil coalesced from the second surface of the membranes or membrane contactors.

18 Claims, 14 Drawing Sheets

Related U.S. Application Data is a continuation-in-part of application No. 13/280,028, filed on Oct. 24, 2011, now Pat. No. 8,617,396, which is a continuation-in-part of application No. 13/006,342, filed on Jan. 13, 2011, now Pat. No. 8,486,267.

(60) Provisional application No. 61/659,918, filed on Jun. 14, 2012, provisional application No. 61/769,286, filed on Feb. 26, 2013, provisional application No. 61/295,607, filed on Jan. 15, 2010.

(51) Int. Cl.
| | |
|---|---|
| *B01D 63/00* | (2006.01) |
| *C02F 1/26* | (2006.01) |
| *B01D 11/00* | (2006.01) |
| *C02F 1/44* | (2006.01) |
| *B01D 17/04* | (2006.01) |
| *C10L 1/02* | (2006.01) |
| *C11B 13/00* | (2006.01) |
| *C11C 3/00* | (2006.01) |
| *C10G 1/04* | (2006.01) |
| *C10G 33/06* | (2006.01) |
| *C10G 1/00* | (2006.01) |
| *C11B 1/00* | (2006.01) |
| *C11B 1/02* | (2006.01) |
| *C11B 1/04* | (2006.01) |
| *C11B 3/00* | (2006.01) |
| *C10G 31/09* | (2006.01) |
| *C10G 53/04* | (2006.01) |
| *C11C 1/08* | (2006.01) |

(52) U.S. Cl.
CPC .............. *C10G 1/045* (2013.01); *C10G 31/09* (2013.01); *C10G 33/06* (2013.01); *C10G 53/04* (2013.01); *C10L 1/026* (2013.01); *C11B 1/00* (2013.01); *C11B 1/02* (2013.01); *C11B 1/04* (2013.01); *C11B 3/001* (2013.01); *C11B 3/006* (2013.01); *C11B 3/008* (2013.01); *C11B 13/00* (2013.01); *C11C 1/08* (2013.01); *C11C 3/003* (2013.01); *B01D 2315/10* (2013.01); *B01D 2325/38* (2013.01); *C10G 2300/1014* (2013.01); *C10G 2300/44* (2013.01); *Y02P 30/20* (2015.11); *Y02W 30/74* (2015.05)

(58) Field of Classification Search
CPC .. C02F 2101/32; C02F 1/444; C02F 2303/24; C02F 2103/365
See application file for complete search history.

(56) References Cited

U.S. PATENT DOCUMENTS

| | | | |
|---|---|---|---|
| 5,209,838 A * | 5/1993 | Sleppy | B01D 61/147 208/179 |
| 5,236,474 A | 8/1993 | Schofield et al. | |
| 5,252,220 A | 10/1993 | Coughlin et al. | |
| 5,263,409 A | 11/1993 | Van Eikeren et al. | |
| 5,350,527 A | 9/1994 | Kitko | |
| 5,378,369 A | 1/1995 | Rose et al. | |
| 5,397,369 A | 3/1995 | Ohishi | |
| 5,639,375 A | 6/1997 | Hiroshi | |
| 5,779,889 A | 7/1998 | Sugiura | |
| 5,938,922 A | 8/1999 | Fulk, Jr. et al. | |
| 5,951,875 A | 9/1999 | Kanel et al. | |
| 5,954,858 A | 9/1999 | Peretti et al. | |
| 5,989,431 A | 11/1999 | Evans et al. | |
| 6,117,327 A | 9/2000 | Ciora et al. | |
| 6,146,535 A * | 11/2000 | Sutherland | B01D 17/08 210/500.23 |
| 6,187,987 B1 | 2/2001 | Chin et al. | |
| 6,436,290 B1 | 8/2002 | Glassford | |
| 6,471,869 B1 * | 10/2002 | Yanou | B01D 61/14 210/195.2 |
| 6,920,637 B2 | 7/2005 | Mason et al. | |
| 7,186,344 B2 | 3/2007 | Hughes | |
| 8,092,685 B1 | 1/2012 | Gonzalez et al. | |
| 8,110,112 B2 | 2/2012 | Alburty et al. | |
| 8,128,827 B2 | 3/2012 | Gallo et al. | |
| 8,202,425 B2 | 6/2012 | Kale | |
| 8,366,794 B2 | 2/2013 | Tremblay et al. | |
| 8,455,669 B2 | 6/2013 | Miranda et al. | |
| 8,486,267 B2 | 7/2013 | Seibert et al. | |
| 8,491,792 B2 | 7/2013 | Kipp et al. | |
| 8,506,685 B2 | 8/2013 | Taylor et al. | |
| 8,617,267 B2 | 12/2013 | Son | |
| 9,149,772 B2 * | 10/2015 | Seibert | B01D 17/085 |
| 2003/0185956 A1 | 10/2003 | Gradley | |
| 2004/0200769 A1 | 10/2004 | Hunsinger | |
| 2004/0222156 A1 | 11/2004 | Yu et al. | |
| 2005/0098504 A1 | 5/2005 | Manz et al. | |
| 2005/0147757 A1 | 7/2005 | Roh et al. | |
| 2006/0191838 A1 | 8/2006 | Lowell | |
| 2006/0275533 A1 | 12/2006 | Fletcher et al. | |
| 2007/0144716 A1 * | 6/2007 | Doh | B01D 63/02 165/158 |
| 2008/0083671 A1 | 4/2008 | Bomberger et al. | |
| 2008/0156191 A1 | 7/2008 | Parekh et al. | |
| 2008/0156709 A1 | 7/2008 | Johnson | |
| 2009/0178928 A1 * | 7/2009 | Groos | B01D 61/445 204/541 |
| 2009/0325269 A1 | 12/2009 | Marschke | |
| 2010/0151098 A1 | 6/2010 | Catchpole et al. | |
| 2010/0173806 A1 | 7/2010 | Fan et al. | |
| 2011/0045528 A1 | 2/2011 | Dhamwichukorn | |
| 2011/0065940 A1 | 3/2011 | Kahelin et al. | |
| 2011/0138682 A1 | 6/2011 | Demaris et al. | |
| 2011/0167712 A1 | 7/2011 | Brasil | |
| 2011/0192792 A1 | 8/2011 | Chew et al. | |
| 2011/0225878 A1 | 9/2011 | Moulijn et al. | |
| 2011/0239865 A1 * | 10/2011 | Huang | B01D 69/08 96/6 |
| 2012/0077255 A1 | 3/2012 | Miranda et al. | |
| 2012/0094340 A1 | 4/2012 | Morgan | |
| 2012/0159839 A1 | 6/2012 | Koskinen et al. | |
| 2012/0208247 A1 | 8/2012 | Kipp et al. | |
| 2012/0226061 A1 | 9/2012 | Shepherd | |
| 2013/0065283 A1 | 3/2013 | Torp et al. | |
| 2013/0334137 A1 | 12/2013 | Seibert et al. | |
| 2014/0131279 A1 | 5/2014 | Seibert et al. | |
| 2014/0243573 A1 | 8/2014 | Seibert et al. | |
| 2015/0087877 A1 | 3/2015 | Seibert et al. | |
| 2016/0008762 A1 | 1/2016 | Seibert et al. | |

FOREIGN PATENT DOCUMENTS

| | | |
|---|---|---|
| EP | 1270063 A2 | 1/2003 |
| EP | 1859852 A1 | 5/2007 |
| JP | 2007209955 A | 8/2007 |
| WO | 9845019 A1 | 10/1998 |
| WO | 0166910 A1 | 9/2001 |
| WO | 2005100542 A1 | 10/2005 |
| WO | 2009094440 A1 | 7/2009 |
| WO | 2011088242 A1 | 7/2011 |
| WO | 2013/025260 A1 | 2/2013 |
| WO | 2013188837 A1 | 12/2013 |
| WO | 2013188849 A1 | 12/2013 |

OTHER PUBLICATIONS

Korean Intellectual Property Office (ISA) International Search Report and Written Opinion for PCT/US2013/046007, dated Oct. 11, 2013, 11 pages.

Korean Intellectual Property Office (ISA) International Search Report and Written Opinion for PCT/US2013/046026, dated Sep. 24, 2013, 13 pages.

(56) References Cited

OTHER PUBLICATIONS

Australian Patent Office (ISA) International Search Report and Written Opinion for PCT/US2013/073816, dated Mar. 13, 2014, 17 pages.
Australian Patent Office (ISA) International Search Report and Written Opinion for PCT/US2011/021185, dated Apr. 8, 2011, 21 pages.
Australian Patent Office (ISA) International Preliminary Report on Patentability for PCT/US2011/021185, dated Jul. 17, 2012, 13 pages.
Machine translation of European Patent Publ. EP1859852A1 (Nov. 28, 2007) entitled "Removal of hydrophile substances from biodiesel using membranes" (abstract, description and claims)—15 pp.
European Patent Office, Extended European Search Report for European Patent Appl. No. 13803446.7 (PCT/US2013/046007) dated May 19, 2015. 7 pp.
European Patent Office, Extended European Search Report for European Patent Appl. No. 13804988.7 (PCT/US2013/046026 dated Jun. 17, 2015. 7 pp.
Machine Translation of Japan Patent Application Publ. No. 2007-209955—Takeo, Yoshida, (Aug. 23, 2007), Abstract, Description and Claims. 38 pp.
Non-Final Office Action mailed Jun. 30, 2016, for U.S. Appl. No. 14/100,186, 8 pages.
Extended European Search Report mailed May 17, 2016, for European Patent Application No. 13876440.2, 13 pages.
Mexican Office Action mailed Jul. 21, 2016, for Mexican Patent Application No. MC/a/2015/000699, 2 pages.
U.S. Appl. No. 14/865,558, filed Sep. 25, 2015, Non-Final Office Action mailed Nov. 3, 2016.
MX Patent Application No. MX/a/2015/000699 filed Jun. 14, 2013, Office Action mailed Feb. 1, 2017, all pages.
U.S. Appl. No. 14/100,186, filed Dec. 9, 2013, Notice of Allowance mailed Jan. 12, 2017, all pages.

\* cited by examiner

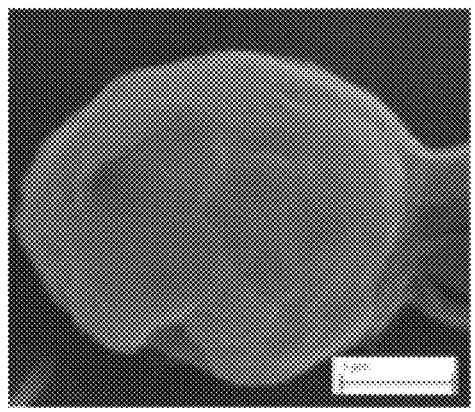
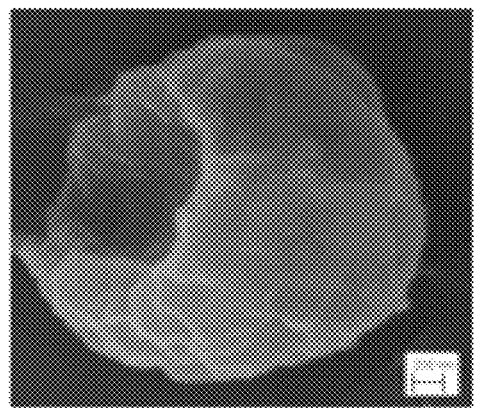
FIG. 3A  FIG. 3B
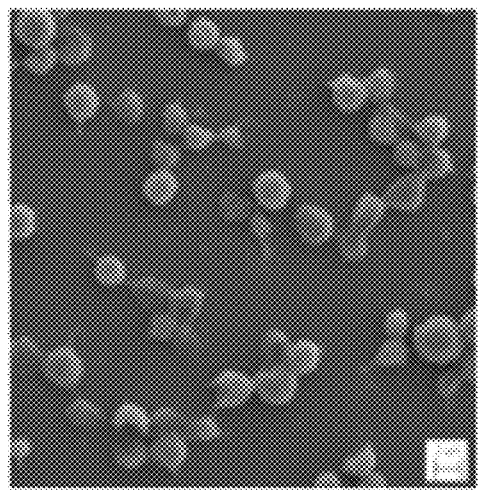
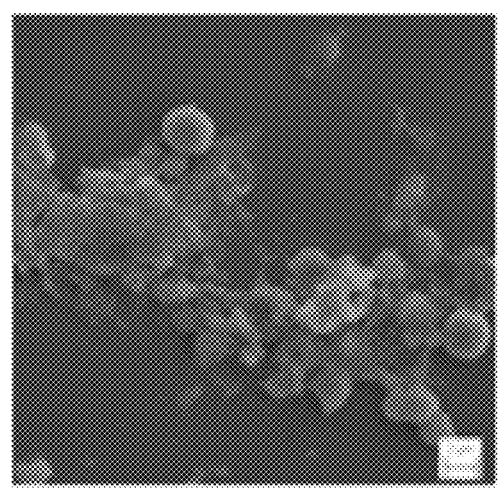
FIG. 3C  FIG. 3D

NON-DISPERSIVE PROCESS FOR OIL RECOVERY

CROSS-REFERENCE TO RELATED APPLICATIONS

This application claims priority to and is a continuation-in-part of U.S. patent application Ser. No. 13/006,342 filed Jan. 13, 2011, which claims priority to U.S. Provisional Application Ser. No. 61/295,607, filed Jan. 15, 2010; and is related to and claims priority to: Continuation-in-Part applications U.S. Ser. No. 13/280,028 filed Oct. 24, 2011 and U.S. Ser. No. 13/358,897, filed Jan. 26, 2012; and further claims priority to: U.S. Ser. No. 61/659,918, filed Jun. 14, 2012 and U.S. Ser. No. 61/769,286, filed Feb. 26, 2013, the entire contents of all of which are incorporated herein by reference.

TECHNICAL FIELD OF THE INVENTION

The present invention relates in general to the field of insoluble oil recovery from liquid sources, and more particularly, to a microporous membrane based method for recovering oil.

STATEMENT OF FEDERALLY FUNDED RESEARCH

None.

REFERENCE TO A SEQUENCE LISTING

None.

BACKGROUND OF THE INVENTION

Without limiting the scope of the invention, its background is described in connection with recovery methods for insoluble and low solubility compounds having economic value from aqueous mixtures that may include one or more types of biological cells or cellular debris.

U.S. Pat. No. 3,956,112, issued to Lee, et al., is directed to a membrane solvent extraction. Briefly, this patent is said to describe a membrane solvent extraction system that is used to separate two substantially immiscible liquids and extract a solute through a solvent swollen membrane from one solvent liquid phase to the extracting solvent liquid without direct contact between the liquid phases. The membrane extraction method has advantages over conventional solvent extraction and may be applied as the mechanism in separation, purification, pollutant removal and recovery processes. This reference relies on liquid extraction, as the solvent swells the membrane to provide the separation.

U.S. Pat. No. 4,439,629 issued to Ruegg (1984) describes a process for extracting either or both beta-carotene or glycerine from algae containing these substances, especially from algae of the genera *Dunaliella*. According to the Ruegg patent either or both of beta-carotene or glycerine can be extracted from algae. If it is desired to extract beta-carotene, the algae are first treated with calcium hydroxide and then filtered. The residue from this filtration is treated with a beta-carotene solvent, which removes the beta-carotene from the residue and into the solvent. The beta-carotene can be recovered from the solvent by conventional means. If it is desired to extract glycerine, the filtrate from the treatment of the algae with calcium hydroxide is neutralized, concentrated and the residue from the solid is treated with a lower alkanol to remove glycerine from the residue.

U.S. Pat. No. 5,252,220, issued to Coughlin, et al., is directed to the preparation of analytical samples by liquid-liquid extraction using microporous hollow-fiber membranes. Briefly, this patent is said to teach a method and apparatus for accomplishing improved liquid-liquid extraction employing microporous hollow-fiber membranes. A number of possible modes of liquid-liquid extraction are possible according to the invention. As with the prior art, this patent relies on the interaction between two liquids, one of the contact side and one on the other side of the membrane for separation.

U.S. Pat. No. 5,378,639 issued to Rose et al. (1995) discloses a method for the solvent-extraction of β-carotene from an aqueous algal biomass suspension, whereby a vegetable oil which is immiscible with water is mixed with an aqueous biomass suspension, the biomass containing the β-carotene, to form a mixture of the organic phase and the aqueous suspension, whereby the β-carotene is caused to dissolve in the organic phase. This is followed by separation of the organic phase from the aqueous phase by passing the organic phase containing the dissolved β-carotene through a semi-permeable membrane to effect microfiltration or ultra-filtration of the organic phase. The membrane is of a material that is hydrophobic and the organic phase is passed through the membrane with a pressure drop across the membrane which is lower than that which causes the aqueous phase to pass through the membrane.

Finally, U.S. Pat. No. 6,436,290, issued to Glassford is directed to a method and apparatus for separating mixtures of organic and aqueous liquid phases. Briefly, this patent is said to include a method and apparatus for separating a mixture containing an aqueous liquid and an immiscible organic phase using microporous hollow fibers. Such mixtures are separated into a substantially organic-free aqueous phase and a substantially aqueous-free organic phase. The mixture is pressurized in a controlled low shear manner to minimize emulsification as it is contacted with the fibers. Productivity is said to be enhanced by separating as a third product stream, a further organic phase containing only small amounts of an aqueous phase, which for some applications can usefully be combined with the substantially aqueous-free organic phase.

SUMMARY OF THE INVENTION

The present invention describes additional methods for coalescing insoluble oil from mixtures using a hydrophobic microporous hollow fiber membrane. In one embodiment, the present invention does not recover a dissolved solute from a carrier using another immiscible liquid called the solvent, but rather, relies on recovering insoluble oil from an oil/water based mixture by coalescence and not extraction. These novel processes could be used in a wide variety of commercially significant applications such as: (i) recovery of released or secreted algal oil from an aqueous mixture, (ii) recovery and removal of insoluble hydrocarbon and hydrocarbon-rich molecules from aqueous mixtures, (iii) recovery of Omega fatty acids from an aqueous mixture, (iv) recovery of Beta-carotene from an aqueous mixture, (v) removal of oil from produced water in petroleum exploration and production and (vi) exclusion of water or other lipophobic liquids from an oil-rich liquid stream.

The novel separation process of the present invention utilizes a non-dispersive method to coalesce and recover an insoluble oil from a liquid source, aqueous slurry, or liquid mixture. As an example, the recovery of non-polar algal oil from an algal concentrate is described. The technique utilizes a microporous hollow fiber membrane contactor. The inventors have tested the Liqui-Cel Extra Flow Contactor, commercially used for gas/liquid contacting, to obtain >80% recovery efficiency and process concentrates up to 10% bio-cellular solids without membrane fouling. The novel technique of the present invention utilizes the large coalescing area provided by the surface of the microporous hollow fibers when filled with a hydrophobic recovery fluid and minimizes the actual contact of the hydrophobic fluid with the (e.g., algae) biomass and aqueous phase.

The novel separation process described herein can be coupled with a variety of appropriate recovery fluids for recovery of insoluble compounds, depending upon the types of compound or compounds to be recovered. The choice of recovery fluid will impact both the sub-set of compounds recovered from the liquid source as well as the downstream steps needed to economically and efficiently use compounds from the recovery fluid. Differential recovery of desired molecules, for example, recovery of non-polar oils, but not more polar oils, can be achieved by choice of recovery fluid. Segregation of non-polar oils from polar oils, specifically polar oils containing phosphorous (e.g., phospholipids), is highly advantageous as phosphorus containing compounds complicate both the refining and transesterification processes used to create transportation fuels and petrochemical feedstocks.

In one embodiment the present invention discloses a method of separating oil/water mixtures, or liquid source, using hydrophobic microporous hollow fiber membrane modules comprising a plurality of microporous hollow fiber membranes comprising the steps of: (i) pumping the oil/water mixture through the inlet port of the contactor to a shell-side of the contactor, (ii) pumping one or more recovery fluids through a second inlet port of the contactor to the one or more hollow fiber membranes on a fiber side of the contactor; wherein the one or more recovery fluids counterflows with the liquid source on the shell-side of the contactor. The one or more recovery fluids comprise one or more hydrophobic liquids, a diesel or biodiesel, an algal oil, a hydrocarbon or non-polar oil or mixtures thereof, (iii) contacting the liquid source on the shell-side with the recovery fluid on the tube surface, (iv) removing a first stream from a first outlet port in the contactor, wherein the first stream comprises an oil/water mixture, and (v) removing a second stream from a second outlet port in the contactor, wherein the second stream comprises the recovery fluid and the one or more coalesced oils. The method described in the embodiment of the present invention further comprises the steps of: (i) collecting the one or more coalesced oils in a recovery vessel, (ii) recycling the recovery fluid by pumping through the one or more microporous hollow fiber membranes to process additional volumes of oil/water mixture, and (iii) pumping the oil/water mixture to another contactor to remove additional oil.

In another aspect the counterflowing recovery fluid comprises hydrophobic liquids, alkanes such as hexane, and aromatic solvents such as benzene, toluene, and ethers such as diethyl ether, halogenated solvents such as chloroform, dichloromethane, and esters such as ethyl acetate. In yet another aspect 45-100% of the one or more oils in the oil/water mixture are coalesced by the method of the present invention. As per the method described in the present invention 45%, 55%, 60%, 65%, 70%, 75%, 80%, 85%, 90%, 95%, and 100% of the one or more oils in the oil/water mixture are recovered.

Another embodiment of the present invention discloses a method of recovering one or more insoluble oils from a liquid source using one or more hydrophobic membranes or membrane modules comprising the steps of: (i) feeding the liquid source comprising the one or more insoluble oils by pumping in a contactor or a vessel, (ii) pumping one or more recovery fluids through the one or more membranes or membrane modules, wherein the one or more recovery fluids counterflows with the liquid source in the contactor or the vessel, wherein the one or more recovery fluids comprise one or more hydrophobic liquids, a biodiesel, an algal oil, a non-polar oil or mixtures and combinations thereof, (iii) contacting the one or more insoluble oils in the liquid source in the contactor or the vessel with one or more recovery fluids pumped through the one or more membranes or membrane modules, (iv) removing a first stream from the contactor or the vessel, wherein the first stream comprises the liquid source without the one or more insoluble oils, and (v) removing a second stream from the contactor or the vessel, wherein the second stream comprises the one or more recovery fluids and the one or more recovered insoluble oils.

In one embodiment, the present invention includes a method of recovering one or more insoluble oils from a liquid source using one or more membrane or membrane contactors, comprising the steps of: pumping the liquid source comprising the one or more oils to one or more membranes or membrane contactors, wherein the liquid source does not contain an amount of solvent sufficient to disperse the oils; contacting the liquid source with a first surface of the one or more membrane or membrane contactors; coalescing the one or more oils within the liquid source onto the first surface of the one or more membrane contactors; pumping one or more recovery fluids through the one or more membrane or membrane contactors in contact with the second surface of the one or more membrane or membrane contactors; and removing a first stream of oil coalesced from the second surface of the one or more membranes or membrane contactors. In one aspect, the method further comprises the steps of collecting the one or more coalesced oils in a collection vessel; and exposing the liquid source one or more times to the one or more membranes or membrane contactors by pumping through the one or more membranes or membrane contactors to process the liquid source two or more times to recover additional oil by coalescence. In another aspect, the liquid source is selected from at least one of oily water, oil industry waste streams, oil contaminated water or brine, wastewater, oil containing drainage water, water contaminated with oil, seawater contaminated with oil, brine contaminated with oil, industrial effluents that comprise oil, natural effluents that comprise oil, drilling mud, tailing ponds, leach residue, produced water, oil sands tailing, frac water, connate water, an oil/water/solid mixture, a gravity separated oil/water/solid mixture, water-oil mixtures, aqueous slurries, aqueous slurries comprising broken cells, live cells or organisms, biocellular mixtures, lysed cellular preparations, or lipophobic contaminants. In another aspect, the liquid source is more than 90% water and the process is used to purify the water by removing the oil. In another aspect, the liquid source is an industrial liquid stream, oil contaminated water or brine, drilling mud, produced water and oil sands tailings the aqueous mixture is processed by the method within 1, 2, 4, 6, 8, 12, 24, 26, 48 or 72 hours from production. In another aspect, the one or more membranes or membrane contactors comprise a hydrophobic hollow fiber membrane selected from at least one of polyethylene, polypropylene, polyolefins, polyvinyl chloride (PVC), amorphous Polyethylene terephthalate (PET), polyolefin copolymers, poly(ethere-therketone) type polymers, surface modified polymers, or surface modified polymers comprise polymers modified chemically at one or more halogen groups by corona discharge or by ion embedding. In another aspect, 45%, 50%, 55%, 60%, 65%, 70%, 75%, 80%, 85%, 90%, 95%, 98%, 99% and 100% of the one or more oils in the liquid source are recovered.

In another embodiment, the present invention includes a method of recovering one or more insoluble oils from a liquid source using one or more membranes or membrane contactors comprising the steps of: contacting a liquid source comprising oil with a first surface of the one or more membranes or membrane contactors, wherein the oil coalesces at the first surface of the one or more membranes or membrane contactors and wherein the oils pass-through the one or more membranes or membrane contactors without liquid-to-liquid contact; and collecting an oil stream of coalesced oil from the second surface of the membrane or membrane modules without the need for a recovery fluid. In another embodiment, the present invention includes a method for separating oil from lipophobic contaminants and solid contaminants in a contaminated oil, comprising the steps of: contacting a source of contaminated oil with a first surface of one or more membranes or membrane contactors; coalescing the one or more oils within the contaminated oil by contacting the contaminated oil with a first surface of one or more membrane contactors; separating the oil from lipophobic contaminants with the one or more membranes or membrane contactors; and collecting the oil coalesced thereby. In one aspect, the contaminated oil is at least one of an oil-rich stream, crude oil, transportation fuel, heating oil, refined petroleum products, petrochemicals, transformer oil, motor oil, lubricating oil, bio-oils, renewable oils, vegetable oils, reclaimed oils, waste oils, or oil sands tailings. In another aspect, the contaminated oil is not subjected to gravity separation prior to processing, is subjected to gravity separation prior to processing, is separated by a centrifugal, centripedal, or hydrocyclone device or process. In another aspect, the contaminated oil is processed by the one or more membranes or membrane contactors within 1, 2, 4, 6, 8, 12, 24, 26, 48 or 72 hours from production. In another aspect, the one or more membranes or membrane contactors are further defined as a hollow fiber microporous hydrophobic membrane selected from at least one of polyethylene, polypropylene, polyolefins, polyvinyl chloride (PVC), amorphous Polyethylene terephthalate (PET), polyolefin copolymers, poly(etheretherketone) type polymers, surface modified polymers, or surface modified polymers comprise polymers modified chemically at one or more halogen groups by corona discharge or by ion embedding techniques. In another aspect, the oil separated from the water by the one or more membranes or membrane contactors is mixed with a counterflowing fluid on the second surface of the one or more membranes or membrane contactors, wherein the at least one counterflowing fluid selected from hydrophobic liquids, alkanes such as hexane, aromatic solvents such as benzene, toluene, ethers such as diethyl ether, halogenated solvents such as chloroform, dichloromethane, ethyl acetate, and esters. In another aspect, the counterflowing hydrophobic liquid is oil recovered from a similar liquid source using the membrane contactor without a recovery fluid or by another method. In another aspect, the contaminated oil is from a bioreactor.

Yet another embodiment of the present invention includes a method of recovering one or more oils from an aqueous mixture using one or more membrane or membrane contactors, comprising the steps of: pumping the aqueous mixture comprising the one or more oils into contact with a first surface of the one or more membrane or membrane contactors; coalescing the one or more oils from the aqueous mixture onto the first surface of the one or more membrane or membrane contactors; and collecting a stream of coalesced oil from the second surface of the one or more membranes or membrane contactors, wherein the stream comprises the oils without the need for a counterflowing recovery fluid. In one aspect, the aqueous mixture is selected from at least one of oily water, oil industry waste streams, oil contaminated water or brine, wastewater, oil containing drainage water, water contaminated with oil, seawater contaminated with oil, brine contaminated with oil, industrial effluents that comprise oil, natural effluents that comprise oil, drilling mud, tailing ponds, leach residue, produced water, oil sands tailing, frac water, connate water, an oil/water/solid mixture, a gravity separated oil/water/solid mixture, water-oil mixtures, aqueous slurries, aqueous slurries comprising broken cells, live cells or organisms, biocellular mixtures, lysed cellular preparations, or lipophobic contaminants that have not been separated or have been separated by at least one of gravity, centrifugal, centripedal, or hydrocyclone separation. In another aspect, the aqueous mixture is processed by the method within 1, 2, 4, 6, 8, 12, 24, 26, 48 or 72 hours from production. In another aspect, the aqueous mixture contains one or more organisms that include at least one of intact cells, lysed cells, apoptotic cells, necrotic cells, wherein organisms comprises two or more different organisms, wherein organism is a yeast, algae or bacteria, or wherein the organism is capable of secreting oil or causing the accumulation of oil outside living cells. In another aspect, the aqueous mixture contains one or more organisms that are genetically modified to render them capable of secreting hydrophobic components, organisms that are capable of causing accumulation of the one or more hydrophobic components outside living cells, organisms that are capable of causing accumulation of the one or more hydrophobic components outside living cells upon induction with one or more chemical probes, exogenous agents, or pharmaceuticals, or combinations thereof. In another aspect, the method further comprises contacting the organism with chemical probes, exogenous agents, or pharmaceuticals, whereby the metabolism of the one or more organism is modified, wherein at least one organism causes accumulation of the one or more oils outside living cells. In another aspect, the method further comprises the step of contacting the one or more oils in the liquid source to remove oil, then returning the aqueous mixture to a growth environment. In another aspect, 45%, 50%, 55%, 60%, 65%, 70%, 75%, 80%, 85%, 90%, 95%, 98%, 99% or 100% of the one or more insoluble oils in the liquid source are recovered. In another aspect, the source of the aqueous mixture is a growth environment for algae, bacteria or yeast and the insoluble oils are recovered the using one or more membrane or membrane contactors comprising the steps of: contacting the growth media comprising organisms and insoluble oils with a first surface in the one or more membrane or membrane contactors; removing a first stream from the contactor or the vessel, wherein the first stream comprises the growth media and organisms, wherein the organisms can continue to produce the insoluble oils; and removing a second stream from the second surface of one or more membrane or membrane contactors, wherein the second stream comprises the one or more insoluble oils without the need for a recovery fluid. In another aspect, the method further comprises feeding or pumping the first stream to the growth environment to resume oil production by the organisms. In another aspect, the one or more membrane or membrane contactors are selected from at least one of polyethylene, polypropylene, polyolefins, polyvinyl chloride (PVC), amorphous Polyethylene terephthalate (PET), polyolefin copolymers, poly(etheretherketone) type polymers, surface modified polymers, or surface modified polymers comprise polymers modified chemically at one or more halogen groups by corona discharge or by ion embedding techniques.

Another embodiment of the present invention includes a system for recovering one or more oils from an aqueous mixture comprising using one or more non-dispersive membrane or membrane contactors, comprising: a source of a stream comprising an aqueous mixture containing oil; a pump that circulates the aqueous mixture comprising the one or more oils to a first surface of the one or more membrane or membrane contactors, wherein the one or more oils coalesce at the first surface of the one or more membrane or membrane contactors; and a collection conduit or vessel for a stream from a second surface of the one or more membrane or membrane contactors, wherein the stream comprises the oils without the need for a counterflowing recovery fluid. In another aspect, the aqueous mixture contains one or more organisms that include at least one of intact cells, lysed cells, apoptotic cells, or necrotic cells, comprises two or more different organisms, comprise yeast, algae or bacteria or comprise organisms capable of secreting oil or causing the accumulation of oil outside living cells. In another aspect, the aqueous slurry contains one or more organisms that are genetically modified to render them capable of secreting hydrophobic components, organisms that are capable of causing accumulation of the one or more hydrophobic components outside living cells, organisms that are capable of causing accumulation of the one or more hydrophobic components outside living cells upon induction with one or more chemical probes, exogenous agents, or pharmaceuticals, or combinations thereof. In another aspect, the method further comprises contacting the organism with chemical probes, exogenous agents, or pharmaceuticals, whereby the metabolism of the one or more organism is modified, wherein at least one organism causes accumulation of the one or more oils outside living cells. In another aspect, the system further contacting the one or more oils in the liquid source to remove oil, then returning the aqueous slurry to a growth environment. In another aspect, the 45%, 50%, 55%, 60%, 65%, 70%, 75%, 80%, 85%, 90%, 95%, 98%, 99% or 100% of the one or more insoluble oils in the liquid source are recovered. In another aspect, the one or more membrane or membrane contactors area selected from at least one of polyethylene, polypropylene, polyolefins, polyvinyl chloride (PVC), amorphous Polyethylene terephthalate (PET), polyolefin copolymers, poly(etheretherketone) type polymers, surface modified polymers, or surface modified polymers modified chemically at one or more halogen groups by corona discharge or by ion embedding techniques. In another aspect, once the system is collecting oil, further comprising the step of counterflowing a recovery fluid that comprises the same oil recovered in the initial operation of the contactor.

Yet another embodiment of the present invention includes a system for improving oil quality of a contaminated oil mixture, comprising: a conduit or vessel that comprises a source of contaminated oil; and a membrane contactor system comprising one or more membranes or membrane contactors each having a first surface that coalesces one or more oils from the contaminants in the oil, wherein the membrane contactor system separates the contaminants from the oil and wherein the contaminants include at least one of a lipophobic liquid, or a solid from the contaminated oil. In one aspect, the contaminated oil is at least one of an oil-rich stream, crude oil, transportation fuel, heating oil, refined petroleum products, petrochemicals, bio-oils, renewable oils, vegetable oils, reclaimed oils, motor oils, transformer oils, lubricating oils, waste oils or oil sands tailings. In another aspect, the membrane contactor is defined further as a hydrophobic membrane or membrane module that comprises hollow fiber microporous membranes selected from at least one of hydrophobic hollow fiber membrane comprises polyethylene, polypropylene, polyolefins, polyvinyl chloride (PVC), amorphous Polyethylene terephthalate (PET), polyolefin copolymers, poly(etheretherketone) type polymers, surface modified polymers, or surface modified polymers comprise polymers modified chemically at one or more halogen groups by corona discharge or by ion embedding techniques. In another aspect, the oil separated from the contaminated oil by the membrane contactor is mixed with a counterflowing fluid, wherein the at least one counterflowing fluid selected from hydrophobic liquids, alkanes such as hexane, aromatic solvents such as benzene, toluene, ethers, diethyl ether, halogenated solvents such as chloroform, dichloromethane, ethyl acetate, esters, or the same oil without the contaminants.

Another embodiment of the present invention includes a method for removing contaminants from a contaminated oil comprising the steps of: obtaining a contaminated oil that comprises oil and lipophobic contaminants; coalescing the oil from the contaminated oil onto a first surface of one or more membrane contactors; collecting the coalesced oil from the contaminated oil; and separately collecting the contaminants from the water stream with a membrane contactor system in the presence of solids small enough to pass into the one or more membrane contactors, wherein the membrane contactor removes the lipophobic contaminants from the contaminated oil. In one aspect, the lipophobic contaminants are from at least one of oily water, oil industry waste streams, oil contaminated water or brine, wastewater, oil containing drainage water, water contaminated with oil, seawater contaminated with oil, brine contaminated with oil, industrial effluents that comprise oil, natural effluents that comprise oil, drilling mud, tailing ponds, leach residue, produced water, oil sands tailing, frac water, connate water, an oil/water/solid mixture, a gravity separated oil/water/solid mixture, water-oil mixtures, aqueous slurries, aqueous slurries comprising broken cells, live cells or organisms, biocellular mixtures, lysed cellular preparations, or lipophobic contaminants from a bioreactor, that have not been separated or have been separated by at least one of gravity, centrifugal, centripedal, or hydrocyclone separation. In another aspect, the contaminated oil is processed by the system within 1, 2, 4, 6, 8, 12, 24, 26, 48 or 72 hours from preparation. In another aspect, the membrane contactor is defined further as a hydrophobic membrane or membrane module that comprises hollow fiber microporous membranes selected from at least one of polyethylene, polypropylene, polyolefins, polyvinyl chloride (PVC), amorphous Polyethylene terephthalate (PET), polyolefin copolymers, poly(etheretherketone) type polymers, surface modified polymers, or surface modified polymers comprise polymers modified chemically at one or more halogen groups by corona discharge or by ion embedding techniques. In another aspect, the oil coalesced on the first surface of the membrane contactor is collected on the second surface of the membrane contactor with a counterflowing fluid, wherein the at least one counterflowing fluid selected from hydrophobic liquids, alkanes such as hexane, aromatic solvents such as benzene, toluene, ethers such as diethyl ether, halogenated solvents such as chloroform, dichloromethane, and esters such as ethyl acetate. In another aspect, the counterflowing oil is oil recovered from a similar liquid source using the membrane contactor without a recovery fluid or recovered by another method.

BRIEF DESCRIPTION OF THE DRAWINGS

For a more complete understanding of the features and advantages of the present invention, reference is now made to the detailed description of the invention along with the accompanying figures and in which:

FIGS. 3A and 3B shows photographs of an algal cell prior to (3A) and after lysing (3B);

FIGS. 3C and 3D shows photographs of algal cells prior to (3C) and after lysing (3D);

DETAILED DESCRIPTION OF THE INVENTION

Figure 1:
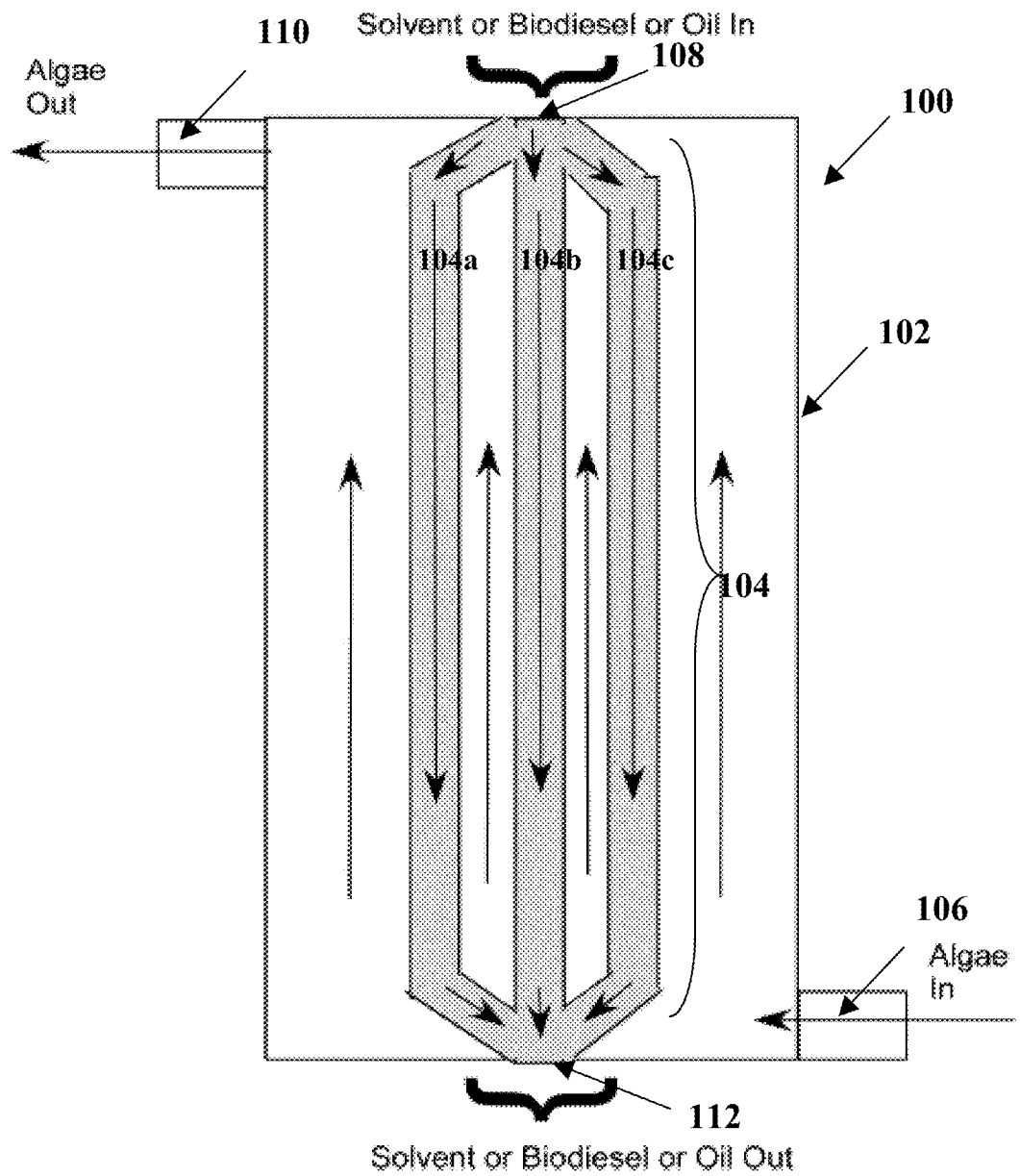
FIG. 1 is a schematic showing the method and the algal oil recovery principle as described in the embodiments of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein, the term "aqueous slurry" encompasses water based liquids containing any of the following in any combination; insoluble oils (hydrocarbons and hydrocarbon-rich molecules of commercial value), living, dead, damaged and/or broken cells (or not), proteins and other cellular debris, including sugars, DNA, RNA, etc. The slurry may also contain a solvent that was used to pre-treat cells to liberate compounds of interest.

As used herein, the term "oil" refers to a single hydrocarbon or hydrocarbon-rich molecule including a complex mixture of lipids, hydrocarbons, free fatty acids, triglycerides, aldehydes, etc. The term oil also includes, e.g., $C_8$ (jet fuel compatible), $C_{60}$ (motor oil compatible) and oils that are odd- or even-chain oils (and mixtures thereof), e.g., from $C_6$ to $C_{120}$. Some compounds are pure hydrocarbons, some have oxygen. Oil also comprises hydrophobic or lipophilic compounds.

As used herein, the term "pumping" includes all methods of pumping, propelling, or feeding fluid from one location to another employing hoses, lines, tubes, ducts, pipes, or pipelines including under pressure. It also includes gravity flow of fluid.

Unlike the prior art, the present invention is based on the discovery that it is possible to feed two immiscible liquids on one side of a hollow fiber membrane, e.g., the shell-side, to cause separation of oils using coalescence versus liquid extraction. By contrast, the prior art, e.g., U.S. Pat. Nos. 3,956,112; 5,252,220; and 6,436,290, are feeding one immiscible liquid on the shell side.

U.S. Pat. No. 3,956,112, issued to Lee, et al., is directed to a membrane solvent extraction. Briefly, this patent is said to describe a membrane solvent extraction system that is used to separate a dissolved solute from one liquid referred to as the carrier and into a second liquid, which is immiscible with the carrier and is referred to as the solvent. Therefore, the hollow fiber membrane is used to extract a solute through a solvent swollen membrane from one solvent liquid phase to the extracting solvent liquid with direct contact between the liquid phases only within the porous walls. The membrane extraction method has potential advantages over conventional solvent extraction in that it does not require a density difference and provides a large amount of contact area. The membrane extraction contactor and may be applied to molecular diffusion based mass transfer separation processes as the mechanism in separation, purification, pollutant removal and recovery processes. The Lee patent relies on liquid extraction, as the solvent swells the membrane filling the pores and providing a diffusional process to extract a dissolved solute from an immiscible liquid carrier.

The present invention uses coalescence to achieve the transfer across the membrane, the component to be removed is essentially insoluble in the feed and we are recovering only the insoluble liquid. In liquid extraction, the component to be removed is dissolved in the feed and the dissolved material is recovered.

In the present invention, the second immiscible liquid (hydrocarbon) is removed from the aqueous feed by coalescence on the surface of the fiber. By contrast, the prior art is removing a dissolved solute (possibly a hydrocarbon).

Finally, unlike the prior art, the present invention does not rely on diffusional mass transfer, but rather, wettability of the insoluble liquid on the fiber. The liquid extraction of the prior art relies on liquid-liquid partitioning, diffusional mass transfer and mass transfer resistances.

In conventional liquid-liquid extraction and coalescing processes involving large drops of oil (greater than 1,000 microns), the mixing and separation of the oil and water phases by a dispersive process is routinely practiced with relative ease. However, when the oil drops are significantly smaller in diameter (less than 10 microns) and solids are present, the complete separation of the immiscible liquids is extremely difficult, if not impossible using dispersive methods routinely practiced for larger oil droplets. When routine methods are applied to try to recover small oil droplets from water in the presence of solids (such as cells or cell debris), a solid-liquid-liquid emulsion layer is created resulting in an incomplete and inefficient separation of the two liquids. Therefore a new process is required that will allow for a more efficient separation and elimination of the solid-liquid-liquid-emulsion problem. The process of the present invention enables the recovery of micron and submicron sized insoluble oil drops from an aqueous slurry utilizing a novel non-dispersive process.

A non-dispersive process promotes a one-way flow of specific compounds into and through a membrane to remove the compounds from the shell side feed to the tube side. A non-dispersive separation process is currently used to remove dissolved gases from liquids such as the removal of dissolved oxygen from water to produce ultra pure water for the microelectronics industry. The present invention is a first successful demonstration of the application of non-dispersive processes to recover insoluble oil from water or aqueous slurries. The non-dispersive process disclosed herein uses a microporous hollow fiber membrane composed of hydrophobic fibers. The aqueous slurry containing the insoluble oil is fed on the shell-side of the hollow fiber module and a hydrocarbon-appropriate solvent, for example, a biodiesel, or similar oil recovered in previous application of the described process is fed on the tube side of the hollow fiber module as a recovery fluid. The aqueous phase passes around the outside of the large surface area of hydrophobic fibers containing the hydrophobic recovery fluid as it passes through and eventually out of the module. As the aqueous liquid with the insoluble oil drops passes through the module, the insoluble oil droplets coalesce on to the walls of the hydrophobic fibers and dissolve into the hydrocarbon-appropriate recovery fluid on the tube side of the module and are carried out of the module with the recovery fluid. In this process, the tube side recovery fluid does not make prolonged contact with the aqueous phase or disperse into the aqueous phase. The absence of this mixing as hypothesized by the inventors prevents the formation of a solid-liquid-liquid emulsion, when solids were present, allowing insoluble oil to be recovered efficiently from an aqueous slurry containing solids. The above hypothesis was successfully demonstrated herein to efficiently recover insoluble oil from an aqueous mixture including cells without the formation of a solid-liquid-liquid emulsion.

In typical membrane filtration processes, small amounts of solids quickly build up on the surface of the membrane (commonly called membrane fouling) reducing the efficiency and cost effectiveness of the filtration process. In the process discovered and disclosed herein using the microporous hollow fiber membrane module, membrane fouling is not a concern within specific operating parameters. The present invention shows that if the module is operated using hydrophilic cells that are small enough to pass through the dimensions of the module, and an appropriate pressure differential is maintained between the aqueous fluid and recovery fluid, then the hydrophilic cells flow through the module and are repelled from the surface of the membrane because the membrane is coated with a hydrophobic recovery fluid. The results presented herein at the prescribed operating conditions do not indicate any evidence of membrane fouling.

The novel recovery process of the present invention utilizes a non-dispersive method to coalesce and recover an insoluble oil from an aqueous slurry. The technique utilizes a microporous hollow fiber membrane contactor. The inventors have tested the Liqui-Cel Extra Flow Contactor, commercially used for gas/liquid contacting, to obtain >80% recovery efficiency and process concentrates up to 10% bio-cellular solids without membrane fouling. The novel technique of the present invention utilizes the large coalescing area provided by the surface of the microporous hollow fibers when filled with a hydrophobic recovery fluid and minimizes the actual contact of the solvent with the (e.g. yeast) biomass and aqueous phase.

The novel recovery process described herein can be coupled with a variety of appropriate recovery fluids for recovery of insoluble compounds, depending upon the types of compound or compounds to be recovered. The choice of recovery fluid will impact both the sub-set of compounds recovered from the aqueous slurry as well as the downstream steps needed to economically and efficiently use compounds from the recovery fluid. Differential recovery of desired molecules, for example, recovery of non-polar oils, but not more polar oils, can be achieved by choice of recovery fluid. Segregation of non-polar oils from polar oils, specifically polar oils containing phosphorous (e.g., phospholipids), is highly advantageous as phosphorus containing compounds complicate both the refining and transesterification processes used to create transportation fuels.

Downstream steps needed to recover desired molecules from the recovery fluid are also application specific. If heptane is used as the recovery fluid, compounds of interest may be recovered by distillation without the need of a steam stripper. If biodiesel (Fatty Acid Methyl Ester [FAME]) is used as the recovery fluid, e.g., recovered oils may not require processing prior to transesterification to FAME. Importantly, the present invention can also use a "self" oil that has been previously recovered from an aqueous slurry as the recovery fluid thereby completely eliminating the need and expense of having to separate the recovered compounds from the recovery fluid. In this application, the recovery fluid is a quantity of oil derived from previously processed aqueous slurry or extracted by a different method. The microporous hollow fiber membrane contactor as described in the present invention is small, portable, economical and is capable of handling large aqueous slurry feed rates.

In another embodiment, the present invention describes a method of recovering one or more hydrocarbons or hydrocarbon-rich molecules (e.g., farnesene, squalane, aldehydes, triglycerides, diglycerides, etc.) or combinations thereof, from an aqueous preparation using one or more hydrophobic membranes or membrane modules. Without limiting the scope of the invention, an example includes recovery of hydrocarbon and hydrocarbon-rich molecules produced by microbial fermentation. Microbial fermentation processes are described in which organisms including algae, yeast, *E. coli*, fungi, etc. are used to metabolize carbon sources (e.g., sugars, sugarcane bagasse, glycerol, etc.) into hydrocarbons and hydrocarbon-rich molecules that are secreted from (or accumulate within) the cells. Such organisms are expected, by design, to produce physically small oil droplets; the inventors hypothesized that these droplets will not readily resolve from water by gravity alone and that the process described herein will be immediately applicable to recover insoluble oils produced by microbial platforms. The companies commercializing microbial fermentation to oil technologies have implied that the recovery of the oil product is trivial, but emerging company disclosures and scientific data suggest recovering the oil from the aqueous growth media is a mission-critical problem. Technologies currently in use, for e.g. centrifugal force sufficient to pellet *E. coli* cells are not sufficient to break the oil/water emulsion that is created in the aqueous growth media by the hydrocarbon-producing *E. coli*.

In addition to the steps listed herein above the method of the present invention further involves the steps of collecting the one or more recovered algal lipid components, algal oils or both in a collection vessel, recycling the separated solvent by pumping through the one or more membranes or membrane modules to process a subsequent batch of lysed algae, converting the one or more recovered algal lipid components, algal oils or both in the collection vessel to Fatty Acid Methyl Esters (FAMEs) or a biodiesel by transesterification or alternatively, refinery-based processing such as hydrocracking or pyrolysis, and processing the first stream comprising the algal biomass by drying the algal biomass to be optionally used as animal feed, feedstock for chemical production, or for energy generation. In the event one or more solvents are used as the recovery fluids, the method includes an optional step for separating the one or more recovered algal lipid components, algal oils or both from the one or more solvents. The lysed algal preparation used in the method of the present invention comprises a concentrate, a slurry, a suspension, a dispersion, an emulsion, a solution or any combinations thereof.

In one aspect the hydrophobic membrane or membrane module comprises microporous hollow fiber membranes, selected from polyethylene, polypropylene, polyolefins, polyvinyl chloride (PVC), amorphous Polyethylene terephthalate (PET), polyolefin copolymers, poly(etheretherketone) type polymers, surface modified polymers, mixtures or combinations thereof. The surface modified polymers comprise polymers modified chemically at one or more halogen groups or by corona discharge or by ion embedding techniques. In another aspect of the method of the present invention the algae are selected from the group consisting of the diatoms (bacillariophytes), green algae (chlorophytes), blue-green algae (cyanophytes), golden-brown algae (chrysophytes), haptophytes, *Amphipleura, Amphora, Chaetoceros, Cyclotella, Cymbella, Fragilaria, Hantzschia, Navicula, Nitzschia, Phaeodactylum, Thalassiosira Ankistrodesmus, Botryococcus, Chlorella, Chlorococcum, Dunaliella, Monoraphidium, Oocystis, Scenedesmus, Nanochlorposis, Tetraselmis, Chlorella, Dunaliella, Oscillatoria, Synechococcus, Boekelovia, Isochysis* and *Pleurochysis*.

In yet another aspect of the method of the present invention, when using one or more counterflowing recovery fluids, these may comprise hydrophobic liquids, alkanes such as hexane, aromatic solvents such as benzene, toluene, ethers such as diethyl ether, halogenated solvents such as chloroform, dichloromethane, and esters such as ethyl acetate. In one aspect the counterflowing non-polar oil comprises algal oils, components of biodiesels selected from monoglycerides, diglycerides, triglycerides, and fatty acid methyl esters.

The present invention describes a method for recovering algae oil from lysed algae concentrate using hydrophobic microporous hollow fiber membrane followed by recovery of the algal oil using a recovery fluid which can be a solvent, a hydrophobic liquid, a biodiesel, an algal oil or mixtures thereof. The technique of the present invention does not require dispersive contacting of the lysed algae concentrate and recovery fluid. The use of a hydrophobic microporous hollow fiber membrane provides a non-dispersive method of coalescing and recovering the algal oil. The lysed algae concentrate is fed on the shell side while algal oil or the recovery fluid is fed on the fiber side. The recovery fluid acts to sweep and remove the coalesced oil within the tube surface of the hollow fibers. A simple schematic representation of the method of the present invention is depicted in FIG. 1.

FIG. 1 shows an algal oil recovery unit 100. The unit 100 comprises a housing 102, within which is contained a membrane module 104 comprising a plurality of microporous hollow fiber membrane units depicted as 104a, 104b, and 104c. The unit has two inlet ports 106 and 108. The lysed algal preparation is fed (pumped) through port 106. A recovery fluid is pumped through inlet port 108. The recovery fluid can be a solvent, a biodiesel, an algal oil or mixtures thereof. The algal preparation counterflows with the recovery fluid flowing inside the microporous hollow fiber membranes 104a, 104b, and 104c. The algal oils or lipid coalesce on the surface of the hollow fiber membranes and are swept by and recovered by the recovery fluid and exit the unit 100 through the outlet port 110. The exit stream is taken for further processing (e.g. solvent recovery) if necessary. The recovery fluid flows out of the unit 100 through port 112.

The method of the present invention using a compatible mixture as the recovery fluid eliminates the need of a distillation system or a stripper to recover the solvent thereby reducing the capital and operating cost of the overall oil recovery process.

A wide variety of organisms can be used to generate oils and lipids that can be recovered with the present invention. Non-limiting examples of algae and microalgae may be grown and used with the present invention including one or more members of the following divisions: *Chlorophyta, Cyanophyta* (Cyanobacteria), and *Heterokontophyt*. Non-limiting examples of classes of microalgae that may be used with the present invention include: Bacillariophyceae, Eustigmatophyceae, and Chrysophyceae. Non-limiting examples of genera of microalgae used with the methods of the invention include: *Nannochloropsis, Chlorella, Dunaliella, Scenedesmus, Selenastrum, Oscillatoria, Phormidium, Spirulina, Amphora*, and *Ochromonas*. Non-limiting examples of microalgae species that can be used with the present invention include: *Achnanthes orientalis, Agmenellum* spp., *Amphiprora hyaline, Amphora coffeiformis, Amphora coffeiformis* var. *linea, Amphora coffeiformis* var. *punctata, Amphora coffeiformis* var. *taylori, Amphora coffeiformis* var. *tenuis, Amphora delicatissima, Amphora delicatissima* var. *capitata, Amphora* sp., *Anabaena, Ankistrodesmus, Ankistrodesmus falcatus, Boekelovia hooglandii, Borodinella* sp., *Botryococcus braunii, Botryococcus sude-*

*ticus, Bracteococcus minor, Bracteococcus medionucleatus, Carteria, Chaetoceros gracilis, Chaetoceros muelleri, Chaetoceros muelleri* var. *subsalsum, Chaetoceros* sp., *Chlamydomas perigranulata, Chlorella anitrata, Chlorella antarctica, Chlorella aureoviridis, Chlorella candida, Chlorella capsulate, Chlorella desiccate, Chlorella ellipsoidea, Chlorella emersonii, Chlorella fusca, Chlorella fusca* var. *vacuolate, Chlorella glucotropha, Chlorella infusionum, Chlorella infusionum* var. *actophila, Chlorella infusionum* var. *auxenophila, Chlorella kessleri, Chlorella lobophora, Chlorella luteoviridis, Chlorella luteoviridis* var. *aureoviridis, Chlorella luteoviridis* var. *lutescens, Chlorella miniata, Chlorella minutissima, Chlorella mutabilis, Chlorella nocturna, Chlorella ovalis, Chlorella parva, Chlorella photophila, Chlorella pringsheimii, Chlorella protothecoides, Chlorella protothecoides* var. *acidicola, Chlorella regularis, Chlorella regularis* var. *minima, Chlorella regularis* var. *umbricata, Chlorella reisiglii, Chlorella saccharophila, Chlorella saccharophila* var. *ellipsoidea, Chlorella salina, Chlorella simplex, Chlorella sorokiniana, Chlorella* sp., *Chlorella sphaerica, Chlorella stigmatophora, Chlorella vanniellii, Chlorella vulgaris, Chlorella vulgaris fo. tertia, Chlorella vulgaris* var. *autotrophica, Chlorella vulgaris* var. *viridis, Chlorella vulgaris* var. *vulgaris, Chlorella vulgaris* var. *vulgaris fo. tertia, Chlorella vulgaris* var. *vulgaris fo. viridis, Chlorella xanthella, Chlorella zofingiensis, Chlorella trebouxioides, Chlorella vulgaris, Chlorococcum infusionum, Chlorococcum* sp., *Chlorogonium, Chroomonas* sp., *Chrysosphaera* sp., *Cricosphaera* sp., *Crypthecodinium cohnii, Cryptomonas* sp., *Cyclotella cryptica, Cyclotella meneghiniana, Cyclotella* sp., *Dunaliella* sp., *Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera* sp., *Effipsoidon* sp., *Euglena* spp., *Franceia* sp., *Fragilaria crotonensis, Fragilaria* sp., *Gleocapsa* sp., *Gloeothamnion* sp., *Haematococcus pluvialis, Hymenomonas* sp., *Isochrysis aff galbana, Isochrysis galbana, Lepocinclis, Micractinium, Micractinium, Monoraphidium minutum, Monoraphidium* sp., *Nannochloris* sp., *Nannochloropsis salina, Nannochloropsis* sp., *Navicula acceptata, Navicula biskanterae, Navicula pseudotenelloides, Navicula pelliculosa, Navicula saprophila, Navicula* sp., *Nephrochloris* sp., *Nephroselmis* sp., *Nitschia communis, Nitzschia alexandrine, Nitzschia closterium, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia* sp., *Ochromonas* sp., *Oocystis parva, Oocystis pusilla, Oocystis* sp., *Oscillatoria limnetica, Oscillatoria* sp., *Oscillatoria subbrevis, Parachlorella kessleri, Pascheria acidophila, Pavlova* sp., *Phaeodactylum tricomutum, Phagus, Phormidium, Platymonas* sp., *Pleurochrysis carterae, Pleurochrysis dentate, Pleurochrysis* sp., *Prototheca wickerhamii, Prototheca stagnora, Prototheca portoricensis, Prototheca moriformis, Prototheca zopfii, Pseudochlorella aquatica, Pyramimonas* sp., *Pyrobotrys, Rhodococcus opacus, Sarcinoid chrysophyte, Scenedesmus armatus, Schizochytrium, Spirogyra, Spirulina platensis, Stichococcus* sp., *Synechococcus* sp., *Synechocystisf, Tagetes erecta, Tagetes patula, Tetraedron, Tetraselmis* sp., *Tetraselmis suecica, Thalassiosira weissflogii,* and *Viridiella fridericiana.*

Other sources for biomass can be a wild type or genetically modified fungus. Non-limiting examples of fungi that may be used with the present invention include: *Mortierella, Mortierrla vinacea, Mortierella alpine, Pythium debaryanum, Mucor circinelloides, Aspergillus ochraceus, Aspergillus terreus, Penicillium iilacinum, Hensenulo, Chaetomium, Cladosporium, Malbranchea, Rhizopus,* and *Pythium.* As the source of biomass is not limited using the devices and methods of the present invention can be wild type or genetically modified yeast. Non-limiting examples of yeast that can be used with the present invention include *Cryptococcus curvatus, Cryptococcus terricolus, Lipomyces starkeyi, Lipomyces lipofer, Endomycopsis vernalis, Rhodotorula glutinis, Rhodotorula gracilis, Candida* 107, *Saccharomyces paradoxus, Saccharomyces mikatae, Saccharomyces bayanus, Saccharomyces cerevisiae,* any *Cryptococcus, C. neoformans, C. bogoriensis, Yarrowia lipolytica, Apiotrichum curvatum, T. bombicola, T. apicola, T. petrophilum, C. tropicalis, C. lipolytica,* and *Candida* sp., e.g., *Candida albicans.*

The biomass can even be any bacteria that generate lipids, oils, proteins, and carbohydrates, whether naturally or by genetic engineering. Non-limiting examples of bacteria that can be used with the present invention include *Escherichia coli, Acinetobacter* sp. any actinomycete, *Mycobacterium tuberculosis,* any streptomycete, *Acinetobacter* calcoaceticus, *P. aeruginosa, Pseudomonas* sp., *R. erythropolis, N. erthopolis, Mycobacterium* sp., B., U. zeae, U. maydis, B. lichenformis, *S. marcescens, P. fluorescens, B. subtilis, B. brevis, B. polmyma, C. lepus, N. erthropolis, T. thiooxidans, D. polymorphis, P. aeruginosa* and *Rhodococcus opacus.*

While algae make oil there is no simple and economical method for extracting the oil directly from an aqueous slurry. Drying algae is usually needed for solvent extraction and the biomass is exposed to toxic solvents. Other methods such as supercritical extraction are uneconomical for commodity products such as fuel. Solvent extraction is somewhat promising but requires distillation of an extract to separate the solvent from the oil. Also, a steam stripper is usually required to recover the residual solvent dissolved or entrained within the exiting algal concentrate. The solvent extraction technique requires contactor equipment or phase separation equipment, a distillation system and a steam stripper along with varying heat exchangers, surge tanks and pumps. Also steam and cooling water are required. The process described herein only requires a membrane system with pumps and tanks; the oil is coalesced, not extracted. No steam or cooling water is required.

Processing Alternatives: After selection of the appropriate solvent, the next step is to determine whether to extract algae oil from "wet" or "dry" algae. The "dry" process requires dewatering and evaporating the water from the algae biomass and then lysing the algae. Lysing is a process of breaking the cell wall and opening the cell. Solvent may be contacted with the dry algae in special counter current leaching equipment. The solvent and extracted algae oil is separated in a vacuum distillation tower or evaporator. The remaining algae biomass with residual solvent is fed to a special evaporator to remove and recover the solvent and to dry the algae biomass again. The "dry" process suffers from having to dry the algae a second time when the solvent must be evaporated away, handling a high solids stream in multiple steps, and potentially leaving solvent in the residual algae solids.

The "wet" process requires lysing and extraction of the algae concentrate. The wet process requires an excellent lysing technique followed by a solvent extraction process, which provides adequate mass transfer area for dissolving/coalescing the non-polar lipids. The "wet" process offers the advantages of drying the algae only once and leaving less residual solvent in the algae biomass. To minimize the processing cost, the "wet" process appears to offer significant advantages.

The present invention focuses on the "wet" process and the novel non-dispersive contactor used to coalesce and dissolve the desirable non-polar lipids.

Figure 2:
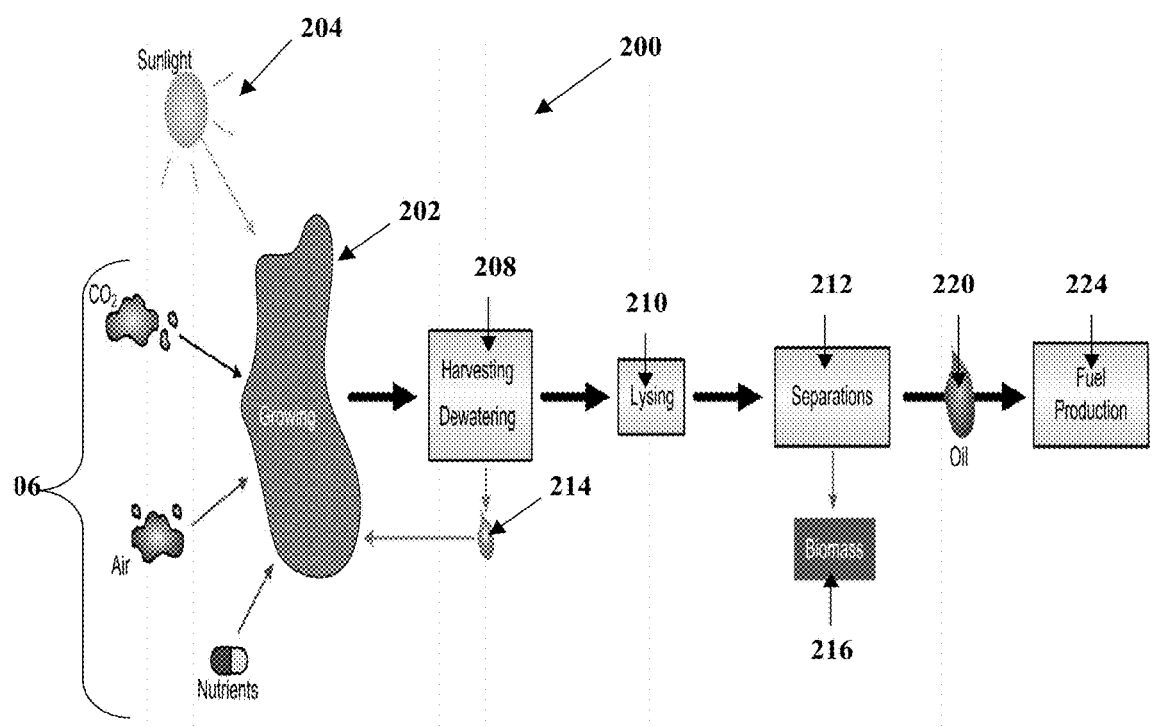
FIG. 2 is a schematic of a general algal oil production process.

As shown in FIG. 2 a complete extraction process 200 begins with the oil extraction step 212 followed by the algae concentration 208 and lysing 210 steps. After growing and initial harvesting under sunlight 204, from the pond 202 the dilute algae feed is concentrated significantly. The microbes such as the algae, media and/or water are returned at step 214. The typical algae concentration obtained from the pond 202 generally ranges from 100 to 300 mg dried algae/liter of solution. The goal of the concentration step 208 is to remove and recycle the water 214 back to the pond. Concentration methods 208 vary from centrifugation to flocculation/settling of the algae. To maximize lysing and oil recovery efficiency, it is important that concentrate being fed for lysing is not flocculated. After the concentration step 208, the algae concentrate is sent to the lysing 210 processing step where the algae cell is mechanically or electromechanically broken, thus exposing and freeing the non-polar oil. Various techniques may be used to mechanically or electrically compress and decompress to break the cell. In general after lysing, 212 the algae cell can be disintegrated or opened-up as shown in FIG. 3. FIGS. 3A and 3C shows photographs of an alga cell prior to lysing and FIGS. 3C and 3D show photographs of algal cells prior after lysing.

Once the oil has been freed from inside the algae cell, the oil will not simply separate from the cellular biomass due to density differences. Also since the equivalent diameters of most microalgae are extremely small and on the order of 1-5 microns, the oil drop diameter is often much less than 1 micron. Such oil drops do not rise or coalesce with other drops very well and can form a stable emulsion. When solid algae biomass 216 is added to the mixture, the recovery of the oil is even more difficult. Therefore simple gravitational phase settling is not a viable oil separation option after lysing.

After lysing, the algae concentrate is fed to the separations step 212 where algae oil 220 is separated from the wet algal biomass 216 to produce fuel 214. The biomass 216 may be sent for further drying and will be used for animal feed or processed further for energy generation applications.

Figure 4:
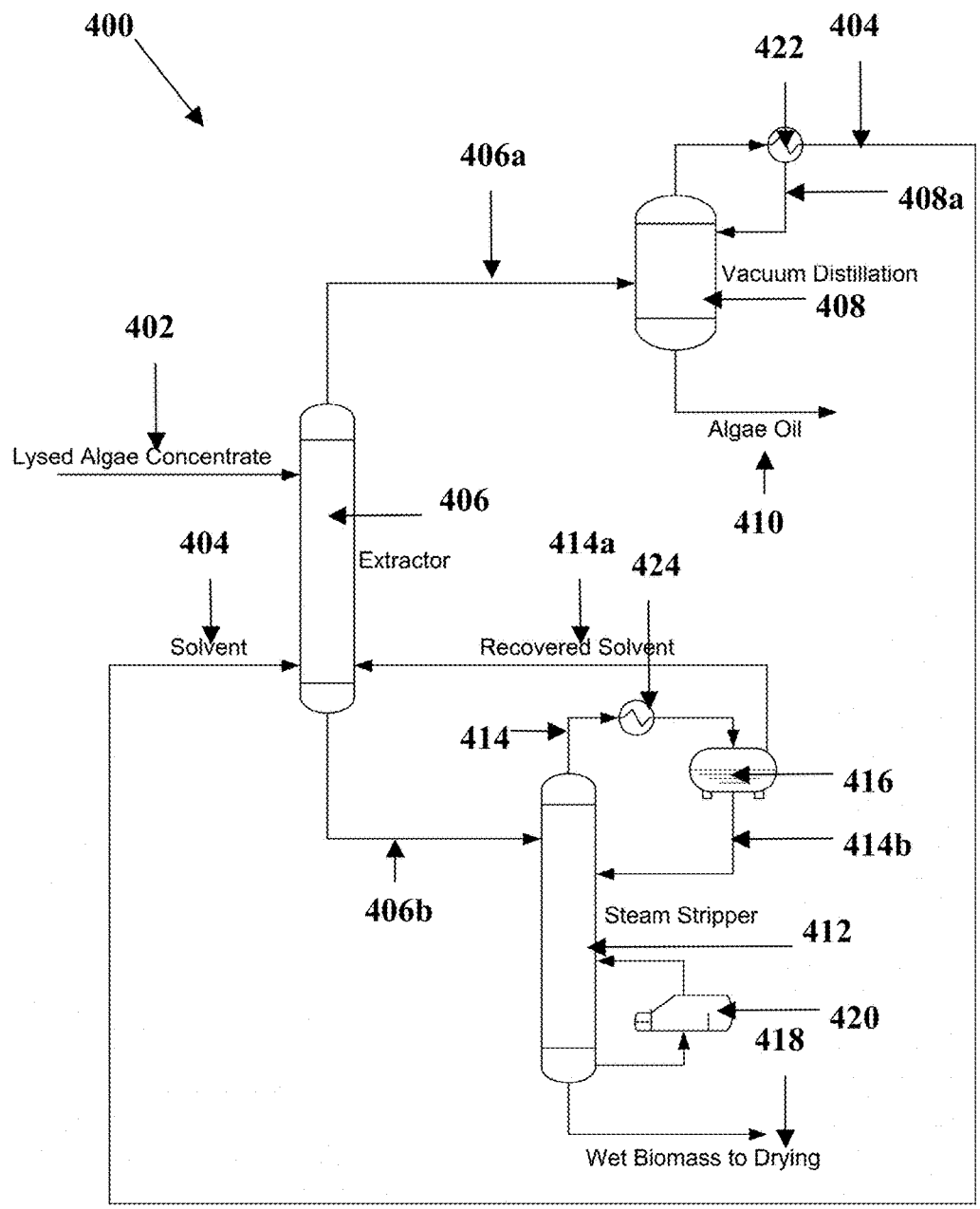
FIG. 4 is a flow diagram of a general algae oil recovery process.

As shown in FIG. 4, the typical solvent extraction process involves 1) an extraction step to recover algae oil from the lysed biomass, 2) a vacuum distillation or evaporation step to separate the oil and solvent where the solvent is returned to step 1, and 3) if necessary, steam stripping step to recover the dissolved and entrained solvent leaving the extraction step with the algal biomass.

FIG. 4 a flow diagram 400 of a general algae oil extraction process using a conventional dispersive extraction column 406. Lysed algal concentrate 402 and solvent 404 is fed to a column extractor 406 to extract the algal oils and lipids 408. Stream 406a comprises the solvent 404 containing the algal oils and lipids. Stream 406a is then fed to a vacuum distillation unit 408 to recover the solvent 404 and the algal oil 410. The separated solvent without any oil or other constituents 404 is fed back to the extractor 406. In the event it needs further purification (separation), the solvent 404 is fed back to the vacuum distillation unit 408 (via stream 408a). A second stream 406b from the extractor 406 comprises the algal biomass, solids, and residual solvent. Stream 406b is passed through a stream stripper 412, to separate the wet biomass 418 and other solids from the solvent 404. The wet biomass 418 is subjected to further drying. The recovered solvent 414 is collected in a decanting vessel 416 before being recycled 420 back to the extractor 406 via stream 414a and can be controlled with valve 424. A second stream 414b from the vessel 416 recycles any dissolved solvent in condensed steam 414 back to the stream stripper 412.

Extraction Processing and Equipment: The desired extraction process for algae oil recovery must satisfy certain requirements and avoid potential deficiencies for economic recovery. There are several "wet" extraction processes for oil recovery that are technically feasible but are not necessarily economical. Minimal oil recovery costs are critical if the ultimate use of the recovered algae oil is fuel.

The optimum oil extraction process should include: (i) processing a bio-cellular aqueous slurry containing oil, (ii) using a non-polar solvent or extracted oil with extremely low miscibility in water, (iii) using a solvent (if necessary), that easily separates from the oil, (iv) using extraction equipment that can handle high processing feed rates and easily scaled-up, (v) using extraction equipment that minimizes the entrainment of solvent into the biomass, (vi) using extraction equipment that provides a high contact area for mass transfer and non-polar lipid coalescence, (vii) using extraction equipment capable of handling concentrated algae feeds and not be irreversibly fouled by algae solids, (viii) using extraction equipment that is relatively compact and potentially portable to allow transport to different algae production sites, and (ix) using extraction equipment that is readily available, inexpensive and safe.

Membrane based processes for separations have been in existence for a long time. There are many types of membranes. Most membrane processes however use porous membranes wherein the membrane material performs a separation as a result of differences in diffusion and equilibrium between chemical components and on the molecular level. The present inventors however utilize a microporous membrane, which is used commercially in applications involving the transfer of gases to or from a liquid such as water. The microporous membranes function very differently from the porous membrane because of their relatively large pores. The microporous membranes do not truly separate chemical components on the molecular level like porous membranes do. The present invention relies on the coalescence of non-polar lipids present within the algae slurry to coalesce onto the hydrophobic surfaces provided by the hollow fibers. The vast surface area of the membrane, combined with the hydrophobic recovery fluid's ability to wet the membrane, creates a surface capable of coalescing small lipid droplets. Once coalesced into the recovery fluid, the lipids are transported out of the membrane through the inner tubes of the hollow fibers.

Membrane based Oil Recovery Process: For example, the application of a microporous hollow fiber (MHF) membrane contactor as the optimal separation equipment appears ideally suited for the recovery of algae oil. The MHF contactor provides all of the optimum characteristics listed previously. The application MHF contactor to algae oil recovery is novel, minimizes solvent loss, eliminates need for the steam stripper, minimizes solids contamination, and is easy to operate. The process does not involve dispersing a solvent into the algae biomass. The non-dispersive nature of the contactor is attractive in minimizing solvent loss and thus potentially eliminating the need for a steam stripper. A recovery fluid typically comprising of either a solvent (such as hexane) or a hydrophobic liquid, or algal oil is circulated through the hollow fibers for the recovery of the algal oils. The application of the MHF contactor in conjunction with a recovery fluid circulated through the microporous hollow fibers eliminates the need for a solvent and distillation column. The two oil extraction processing schemes with solvent and the recovery fluid are shown in FIGS. 5 and 6, respectively.

Figure 5:
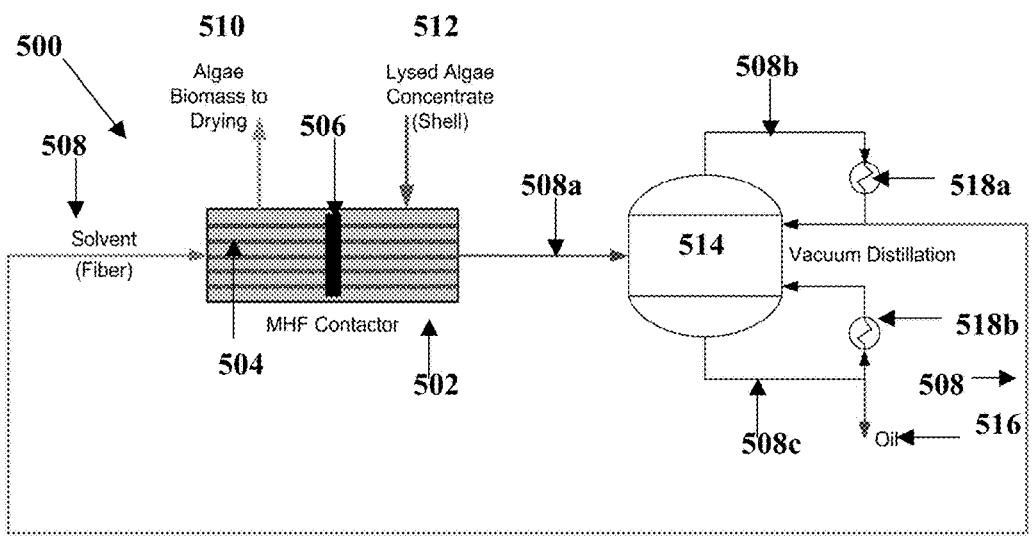
FIG. 5 is a flow diagram of the novel algal oil recovery process (with solvent) of the present invention.

FIG. 5 is a schematic 500 depicting the novel algal oil recovery process (with solvent) of the present invention. The process comprises a MHF contactor 502 comprising a plurality of microporous hollow fiber membranes 504 and a central baffle 506. Solvent 508 is fed (pumped) through the membrane fibers 504 and is contacted with the lysed algal concentrate 512 contained in the shell portion of the MHF contactor 502. There are two exit streams from the contactor 502, an algal biomass stream 510 which is processed further (dried) and a solvent stream 508a which contains the recovered algal oils and lipids 516. The stream 508a is passed through a vacuum distillation unit 514 to separate the oil 516 from the solvent 508 and to recover the solvent 508 for recycle and reuse. Exit stream 508b from the distillation unit 514 comprises pure solvent 508 which is recycled and fed to the contactor 502 to repeat the process and solvent requiring further separation and is recycled back to the distillation unit 514. Exit stream 508c from the distillation unit 514 comprises the algal oils 516. A portion of this stream is vaporized (518b) and returned to the distillation unit 514.

Figure 6:
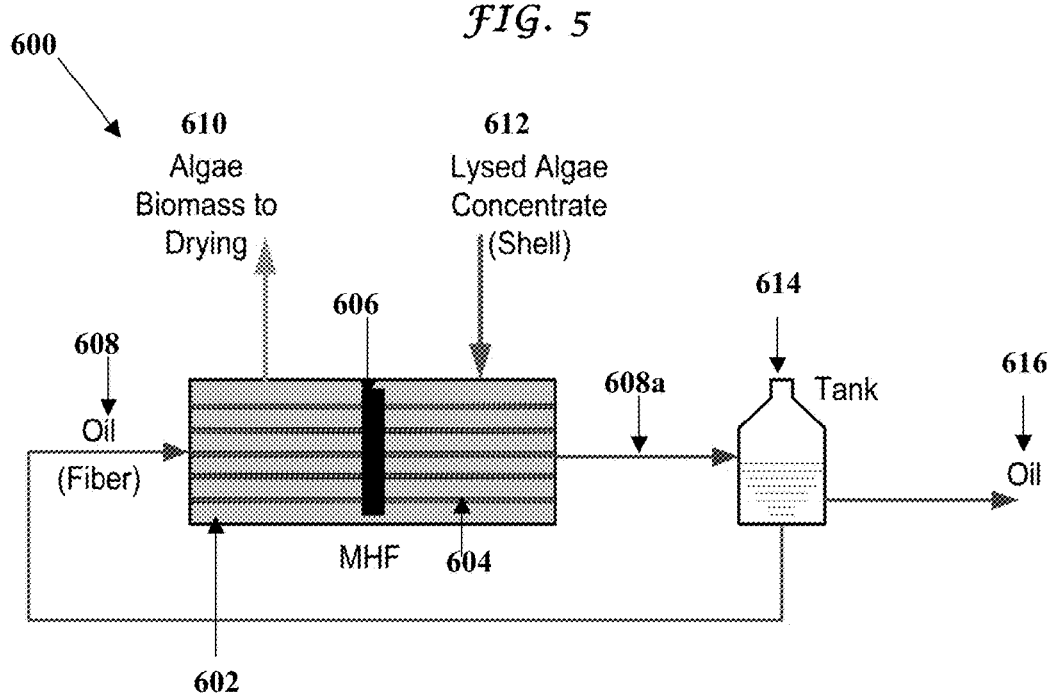
FIG. 6 is a flow diagram of the novel algal oil recovery process (without solvent) of the present invention.

FIG. 6 is a schematic 600 depicting the novel algal oil recovery process of the present invention. The process comprises a MHF contactor 602 comprising a plurality of microporous hollow fiber membranes 604 and a central baffle 606. Non-polar algae oil 608 is fed (pumped) through the membrane fibers 604 and is contacted with the lysed algal concentrate 612 contained in the shell portion of the MHF contactor 602. The non-polar algae oil functions to dissolved and sweep the coalesced oil from the algae concentrate. The non-polar oil 616 coalesces onto the hydrophobic fiber surface 604 and dissolves into oil contained in the walls and the counterflowing oil phase 608 and can be removed. There are two exit streams from the contactor 602, an algal biomass stream 610 which is processed further (dried) a stream 608a which contains the algal oils and lipids 616 that is collected in a tank 614. Part of the oil 616 can be removed from the tank 614 and fed to the contactor 602 to repeat the process.

Microporous hollow fiber contactors were initially developed in the 1980s. These early studies focused on lab-scale prototype modules containing just a few fibers. These early studies promoted the possibility of liquid-liquid extraction applications. The contacting of two immiscible liquids such as water and a non-polar solvent is unique with MHF contactors in that there is no dispersion of one liquid into another. This technology is sometimes referred to as non-dispersive extraction. The hollow fibers are generally composed of a hydrophobic material such as polyethylene or polypropylene. These hollow fibers could be made of a different material but it should be hydrophobic to avoid fouling of the fiber surface with the algae solids which are usually hydrophilic. The solvent should be a hydrocarbon with a very low solubility in water and is pumped through the hollow fibers. As a result of the hydrophobicity of the fiber material, the solvent will wet the microporous fibers and fill the micropores. The aqueous-based fluid is pumped through the shell-side of the membrane contactor. To prevent breakthrough of the solvent into the shell-side, the shell or aqueous side is controlled at a higher pressure than the fiber or hydrocarbon side. This results in immobilizing a liquid-liquid interface in the porous walls of the hollow fibers. Unfortunately when these modules were scaled-up for liquid-liquid extraction, the performance was usually disappointingly poor. Further studies identified the poor efficiency was a result of shell-side bypassing. An improved version (referred to as the Liqui-Cel Extra Flow contactor) was developed which eliminated the possibility of shell-side bypassing by incorporating a shell-side distributor. While the design eliminated the shell-side bypassing, the new design eliminated true counter-current contacting. The overall performance was improved somewhat relative to the original design. Nevertheless, the new design did not correct the fundamental limitations of pore-side mass transfer resistance that would control most commercially significant extraction applications. As a result, only a few commercial liquid extraction applications using MHF contacting technology exist today.

Also, the MHF contactors often required expensive filter systems to avoid plugging with solids associated with most commercial liquid-liquid extraction processes. The Liqui-Cel contactor used in the present invention has been applied almost exclusively to commercial processes that transfer a gas to or from a liquid such as oxygen stripping from water for the microelectronics industry.

No applications of the MHF contactors are known for enhancing coalescence and removing of oil drops from water. Certainly no applications of MHF technology are known for oil recovery from water involving a significant solids concentration.

Figure 7:
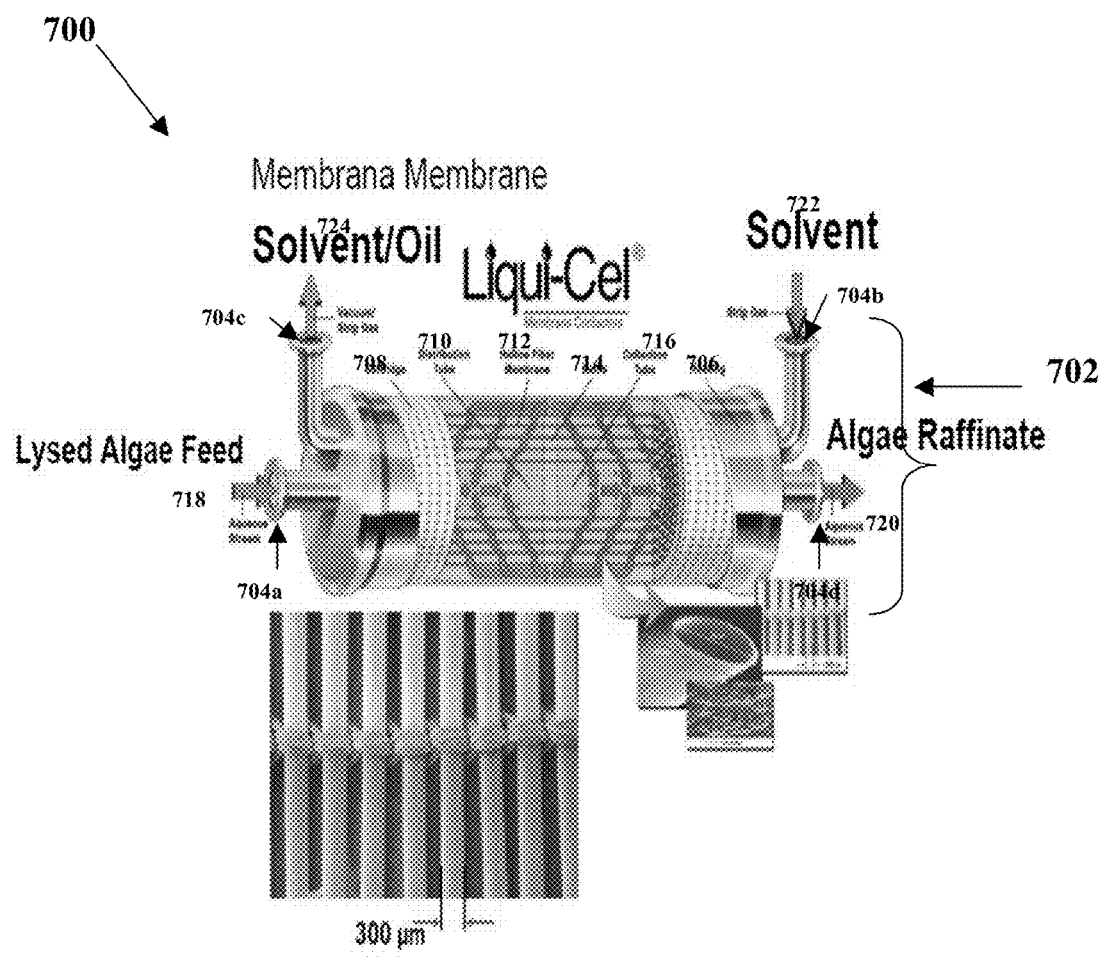
FIG. 7 is a schematic of the Liqui-Cel extra flow microporous hollow fiber membrane contactor.

FIG. 7 is a schematic 700 of the Liqui-Cel extra flow microporous hollow fiber membrane contactor 702. The contactor 702 comprises a metallic or polypropylene housing 706, wherein is contained a cartridge 708 comprising a plurality of hydrophobic microporous hollow fibers 712, along with a distribution tube 710, a collection tube 716, and a central baffle 714. The housing 706 has 2 inlet ports (704a and 704b) and two outlet ports 704c and 704d.

As shown in FIG. 7, the aqueous phase 718 is fed through the port 704a on the shell-side while the solvent (or oil) phase 722 is fed on the fiber side through port 704b. The non-polar lipids coalesce onto the hydrophobic surface and wet and dissolve into walls and into the counterflowing solvent (or oil) phase. A higher pressure is maintained on the aqueous side to prevent bleed through of the solvent (or oil) phase. However the shell-side pressure is kept below the breakthrough pressure which forces aqueous phase 718 into the solvent (or oil) phase 722. The algae concentrate 718 and solvent feeds 722 could be operated at room temperature or preheated up to 60° C. The solvent (or oil) phase along with the recovered lipids or oils is removed through outlet port 704c, and the aqueous algal raffinate containing the algal biomass and other solids is removed through the port 704d.

While not intuitive because of the presence of algae solids, the MHF contactor appears ideal for recovering oil from lysed algae. The MHF contactor provides: (i) high contact area for coalescence and mass transfer, (ii) processing of un-flocculated or deflocculated algae solids, (iii) large flow capacities on the shell side, (iv) negligible mass transfer resistance in the pore because of the high equilibrium distribution coefficient of non-polar oils into non-polar solvent, and (v) low cost per unit of algae flow per unit as the contact area is 100× that for the conventional liquid extraction contactor (e.g. perforated plate column).

The MHF contactor provides four significant advantages: (i) no density difference is required, (ii) no entrainment of solvent which may eliminate the need for a stripping column when the proper solvent is selected, (iii) easy control of the liquid-liquid interface by controlling the pressures, (iv) extremely large area for coalescence of small algae oil drops. The MHF contactor functions primarily as an oil coalescer. The solvent acts to simply remove the coalesced oils from the surface of the fibers, and (v) while not optimized, commercial MHF contactor modules used for gas transfer are available and reasonably priced. The Liqui-Cel Extra Flow contactor is a good example.

MHF Contactor Performance Data: The present inventors characterize the performance of the MHF contactor for algal oil recovery. The objectives of the studies were to determine the fraction of non-polar algae recovered from the feed and determine if membrane plugging was observed. The 4-inch diameter Liqui-Cel Extra Flow Contactor, purchased from Membrana [Part#G503], was used to recover algae oil from an actual lysed algal concentrate (FIG. 7). Typical oil recoveries from experimentally lysed algae ranged from 45→80% for a single module. The results of the studies are shown in Table 1. Differences in oil recoveries may be attributed to the lysing efficiency, polarity of the algae oil, differences in oil wettability and coalescence onto the membrane fibers. Membrane plugging is not observed when processing lysed algae concentrates where the algae is not flocculated or has been deflocculated. A typical range of conditions associated with the recovery of non-polar algae oil is shown in Table 1. These data are based on the processing of actual lysed algae. Since the non-polar oil recovery efficiency is also affected by the lysing efficiency, controlled experiments were carried out where known quantities of canola oil were injected into a re-circulating algae concentrate stream. In the first set of studies, heptane was re-circulated on the tube side as a non-polar oil specific recovery fluid. The results of these studies are shown in Table 2. In the initial small scale studies, 44-64% of the injected oil volume was recovered by the microporous hollow fiber membrane when only 25 mLs of canola oil was injected. When a larger quantity of canola oil was injected (250 mL), more than 90% of the injected oil volume was recovered as shown in Table 2. These data provide evidence that a fixed volume of oil is likely held up in the walls of the hollow fibers. In a second set of studies using canola oil injected into lysed algae concentrate, canola oil was re-circulated through the hollow fiber tubes as a recovery fluid instead of heptane. As shown in Table 3, 93% of the 9 liters of injected canola oil was recovered, conclusively demonstrating that a "like" oil can be used as a recovery fluid. The second set of studies validates the mechanism that the process is based on coalescing and recovery of the oil drops from the aqueous slurry can be done using a "like" oil. The canola oil runs also provide supporting data for the application of the non-dispersive microporous hollow fiber technology in removing residual oil from produced water, as canola oil/water emulsions are an accepted experimental proxy to mimic produced water in a laboratory setting. The results from Tables 2 and 3 indicate that oil recoveries approaching 100% are possible. The walls of the hollow fibers will always contain oil during processing.

TABLE 1

Typical algal oil recoveries from lysed algae with the MHF Contactor.

| Parameter | Overall Range | Typical Range |
|---|---|---|
| Algae concentration, wt % | 0.01-15 | 1-5 |
| Non-polar Oil in Algae, wt % | 0.5-10 | 2-6 |

TABLE 1-continued

Typical algal oil recoveries from lysed algae with the MHF Contactor.

| Parameter | Overall Range | Typical Range |
|---|---|---|
| Algae Flow rate, gpm | 0.5-2 | 0.5-1 |
| Heptane Flow rate, gpm | 0.04-0.07 | 0.07 |
| Non-polar Oil Recovery, % | 40-90 | 70-80 |

TABLE 2

Results of controlled study using Heptane flowing through the tubes. Basis: Algae feed rate = 1,000 lbs/hr, Heptane feed rate = 50 lbs/hr, Total mass of re-circulating algae = 50 lbs containing approximately 1.5 wt % bio-cellular solids, Oil injection rate = 0.17 lbs/hr.

| | Test | | | |
|---|---|---|---|---|
| | #1 | #2 | #3 | #4 |
| Oil Injected, ml | 25 | 25 | 210 | 210 |
| Oil Recovered, ml | 11 | 16 | 198 | 188 |
| Missing Oil | 114 | 99 | 12 | 22 |
| % Oil recovery | 44 | 66 | 94 | 90 |

TABLE 3

Results of the solventless test with Canola oil flowing through the tubes. Shell-side and tube-side flows are re-circulated.

| Tube-Side | Canola Oil |
|---|---|
| Shell-Side | 50 lbs of Algae Concentrate |
| wt % bio-cellular solids in algae | Approximately 1.5 wt % |
| Tube Side Flow rate | 10-15 lbs/hr |
| Shell Side Flow rate | 500, lbs/hr |
| Canola Oil Injection Rate into Algae | 3 ml/min |
| Run Time | 72 hours |
| % Recovery of Injected Canola Oil | 93% |

It should be noted that the algae concentrate feed or bio-cellular feed must not contain flocculated algae or solids to prevent plugging within the membrane module. For the case of the MHF contactor described in the present invention, the minimum dimension for shell-side flow is 39 microns which is greater than the size of most single alga. It is likely that flocculated algae will eventually plug the shell-side of the MHF contactor.

In a related and alternative process, the microporous membrane could be used to separate two liquids from a solid-liquid-liquid emulsion. The solid-liquid-liquid emulsion may have been derived from a process for recovering oil from a bio-cellular aqueous feed using a dispersive process. The microporous membrane hollow fiber contactor would allow the hydrocarbon liquid to "wet" and coalesce into the walls of the hollow fibers while preventing the hydrophilic solids or aqueous phase from entering. Thus the hydrocarbon liquid will exit the membrane on the tube side when an appropriate recovery fluid is employed, while the aqueous liquid and solids will exit on the shell-side. An alternative process is shown in FIG. 9.

Figure 9:
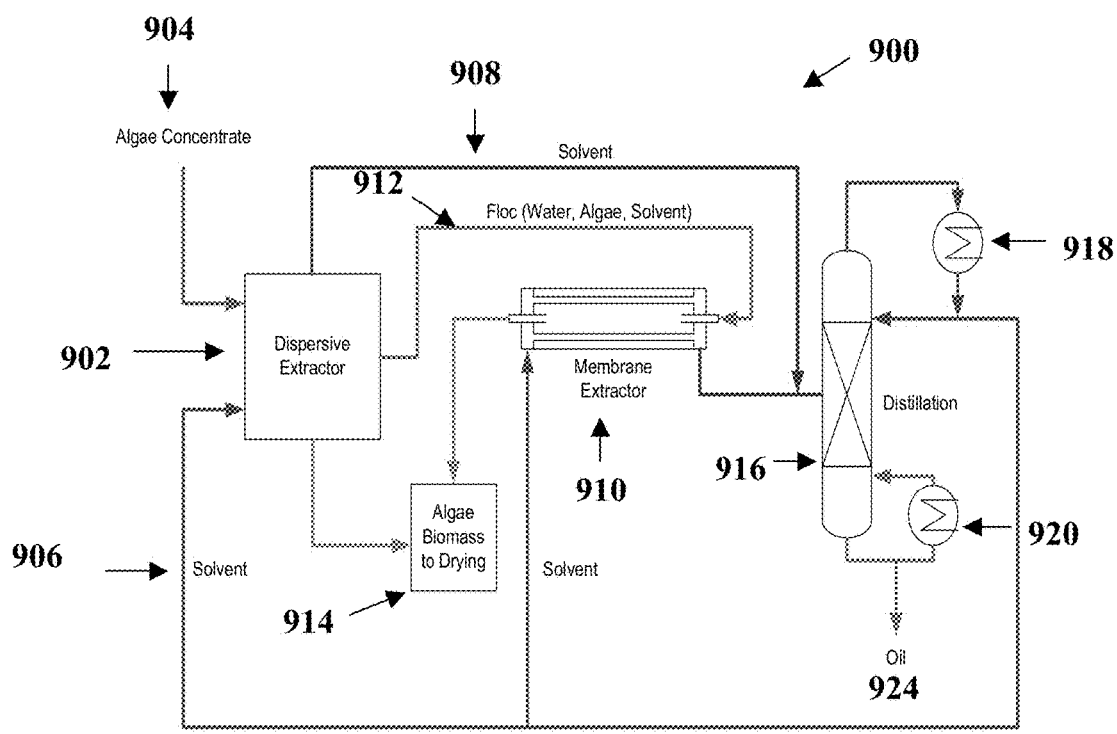
FIG. 9 shows an alternative process where a solid-liquid-liquid emulsion potentially derived from a dispersive extraction is fed to the shell-side of the microporous hollow fiber membrane for the purpose of separating the two liquids.

The flow diagram 900 shown in FIG. 9 of the alternative algae oil extraction process comprises a dispersive extraction column 902, lysed algal concentrate 904 and solvent 908 is fed to a dispersive extractor such as a column extractor, centrifugal type extractor or mixer-settler 902. The solid-liquid-liquid emulsion (S-L-L) 912 from the column 902 comprising algae-water-solvent is then fed to a shell-side of a microporous membrane extractor (contactor) 910. Any solids (algal biomass) from the column extractor 902 may be directly subjected to further processing (e.g. drying) as shown by step 914. The microporous membrane hollow fiber contactor 910 allows the hydrocarbon liquid to "wet" and coalesce into the walls of the hollow fibers while preventing the hydrophilic solids or aqueous phase from entering. The hydrocarbon liquid exits the membrane contactor 910 on the tube side when an appropriate recovery fluid (for e.g. solvent 908) is employed on the tube side, while the aqueous liquid and solids (algal biomass) will exit on the shell-side for further processing (e.g. drying) as shown by step 914. The hydrocarbon liquid is then fed to a distillation unit 916 (heat exchangers associated with the distillation unit are shown as 918 and 920) for removal of any residual solvent 906 and to recover the algal oil 924. The recovered solvent 906 may be circulated back into the process, for e.g. as the recovery fluid on the tube-side of the membrane contactor 910 or back to the dispersive extraction column 902.

The recovery fluid on the tube side can be tailored to enhance recovery or selectively recover sub-sets of desired compounds, and leave others. Study data demonstrates that hydrocarbons and non-polar lipids are removed using heptane or like oil and phospholipids are not.

Figure 8:
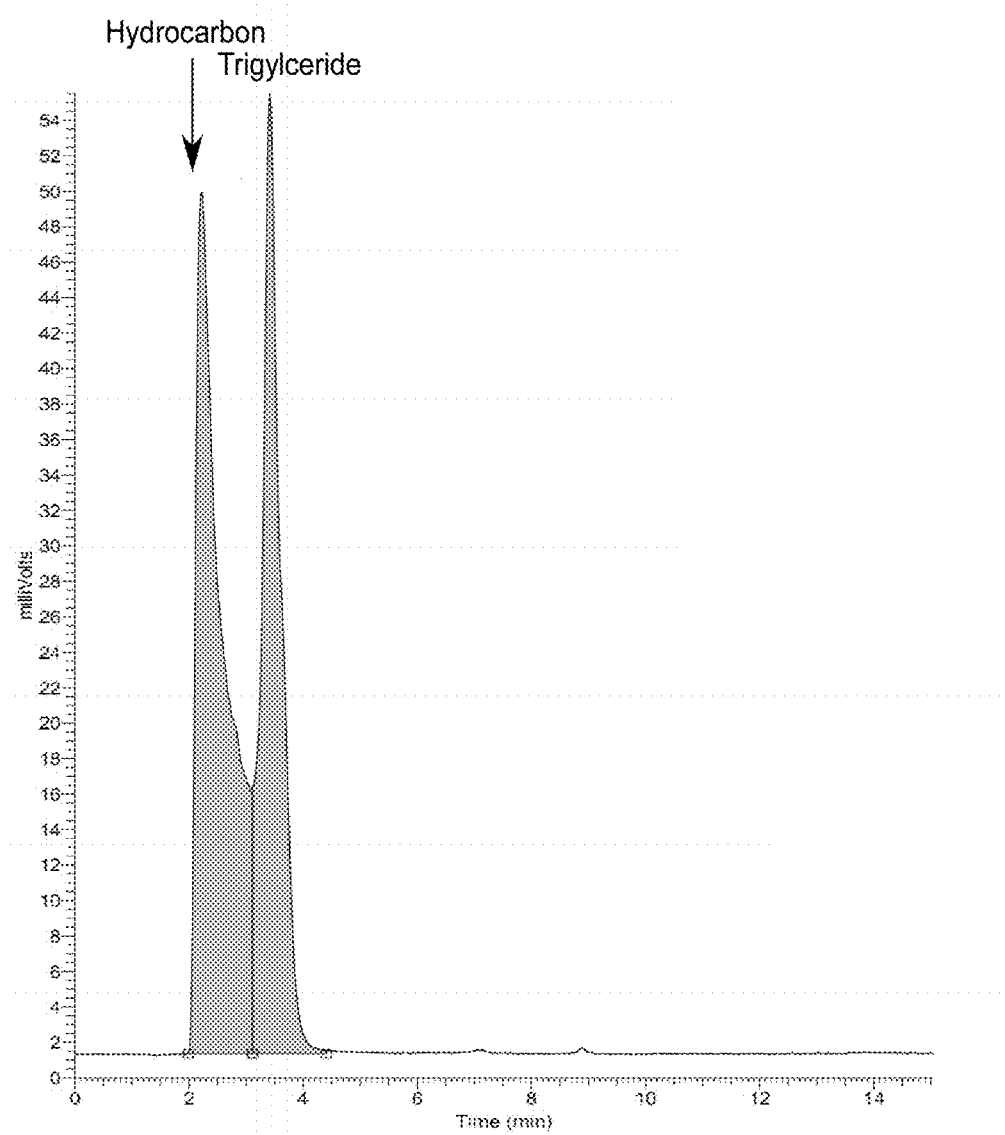
FIG. 8 is a HPLC trace (chromatogram) of oil obtained using hollow fiber membrane recovery of oil from a lysed suspension of Nanochloropsis. Two main peaks are seen in this sample, the first is a mixture of various long chain hydrocarbons and the second is a triglyceride.

To determine the composition of the recovered oil, the inventors performed a normal phase HPLC using a Sedex 75 evaporative light scattering detector. As shown in FIG. 8, two main components were detected in this particular sample of oil, the first peak corresponding to long chain hydrocarbons and the second corresponding to triglycerides. In some samples, 1,3 and 1,2 diglyceride have also been detected.

Figure 10:
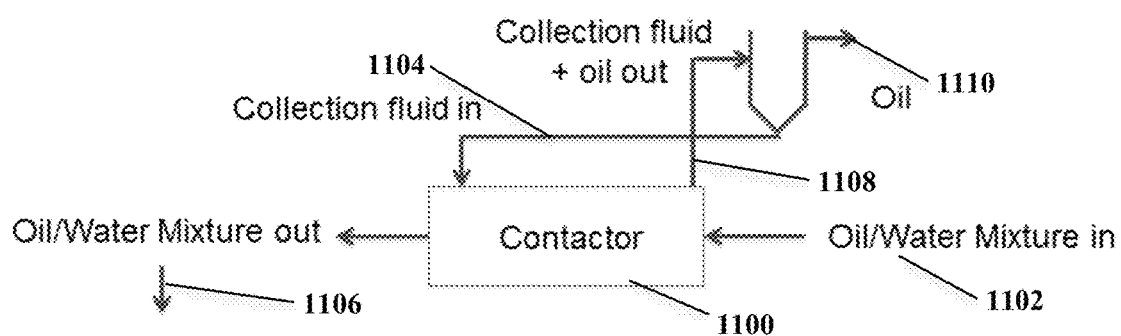
FIG. 10 is a schematic showing the method and the oil/water separation principle for recovery/removal of oil from an oil/water mixture as described in the embodiments of the present invention.

FIG. 10 is a schematic showing the method and the oil/water separation principle for recovery/removal of oil from an oil/water mixture as described in the embodiments of the present invention. In this mode of operation the present invention can be used for most oil/water mixtures that are up to ~90% oil by volume. The oil-water mixture emanating from the shell side may be further processed, for example with an additional contactor. In this embodiment, an oil/water mixture 1102 enters the membrane contactor 1100 and the oil coalesces on a first surface of the membrane contactor 1100. A recovery fluid 1104 that is in contact with a second surface of the membrane contactor 1100 collects coalesced oil 1108. An oil/water mixture without the coalesced oil 1106 and recovered exits the membrane contactor 1100 and can be further processed by contacting with the same or a different membrane contactor (not shown).

Figure 11:
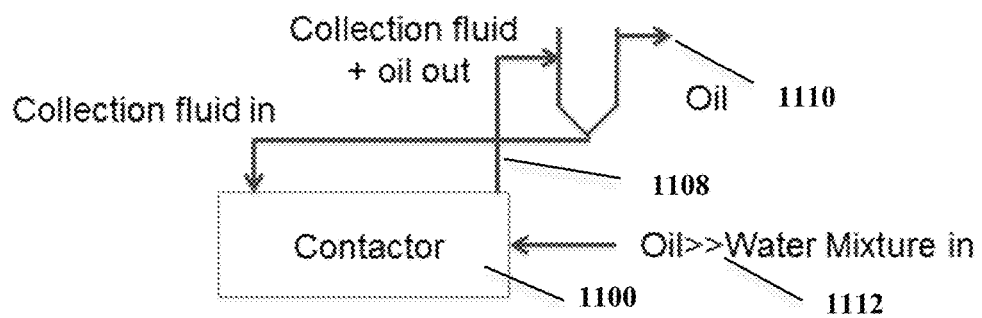
FIG. 11 is a schematic showing the method and the oil/water separation principle for exclusion of water from a water/oil mixture.

FIG. 11 is a schematic showing the method and the oil/water separation principle for exclusion of water from a water/oil mixture. In this mode of operation the present invention is appropriate for very low water content streams. With the shell side outflow capped, the excluded water will accumulate in the shell side of the module. The tube side oil outflow rate can be used to indirectly monitor the accumulation of water in the shell side. As water accumulates, the effective shell side surface area begins to decrease, leading to reduced tube side flows. Briefly opening the shell side outflow valve can purge the accumulated water and return the unit to high efficiency operation. In this embodiment, an oil>>water mixture 1112 enters the membrane contactor 1100 in which the oil is the primary portion of the liquid and the water or other non-oil liquid is a lesser part of the mixture, and the oil coalesces on a first surface of the membrane contactor 1100. A recovery fluid 1104 that is in contact with a second surface of the membrane contactor 1100 collects coalesced oil 1108. An oil/water mixture without the coalesced oil 1106 exits the membrane contactor 1100 and can be further processed by contacting with the same or a different membrane contactor (not shown). In one embodiment, the amount of oil to water/non-oil liquid, volume to volume, may be 50:50, 60:40, 70:30, 80:20, 90:10, 91:9, 92:8, 93:7, 94:6, 95:5, 96:4, 97:3, 98:2, 99:1, 99.5:0.5, 99.6:0.4, 99.7:0.3, 99.8:0.2, and 99.9:0.1.

Figure 12:
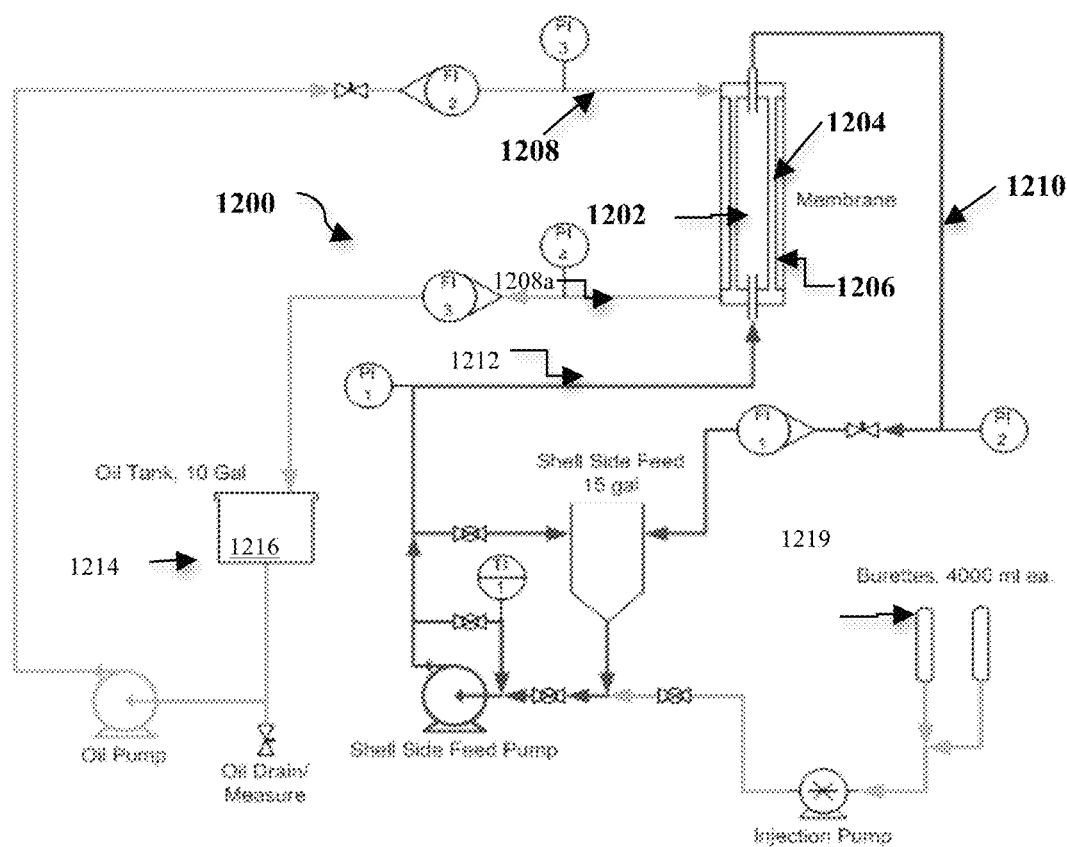
FIG. 12 is a flow diagram of the equipment used to create oil water mixtures and separate it.

FIG. 12 is a flow diagram of a membrane contactor system 1200. In this embodiment, the membrane contactor 1202 is a schematic 1200 depicting a novel oil recovery process of the present invention. The process comprises a MHF contactor 1202 comprising a plurality of microporous hollow fiber membranes 1204 and a central baffle 1206. In one non-limiting example of an oil, non-polar Algae oil 1208 is fed (pumped) through the membrane fibers 1204 and is contacted with the lysed yeast or algal oil concentrate 1212 contained in the shell portion of the MHF contactor 1202. The non-polar oil 1216 coalesces onto the hydrophobic fiber surface 1204 and dissolves into oil contained in the walls and the counterflowing oil phase 1208 and can be removed. There are two exit streams from the contactor 1202, a yeast or algal biomass stream 1210 which is processed further (dried) a stream 1208*a* which contains the yeast or algal oils and lipids 1216 that is collected in a tank 1214. Part of the oil 1216 can be removed from the tank 1214 and fed to the contactor 1202 to repeat the process. Media, nutrients, additional organisms (yeast or algae), liquid or other compositions can be provided from burettes 1219. Multiple pumps and valves may be used to control the flow of the various liquids and components.

Figure 13:
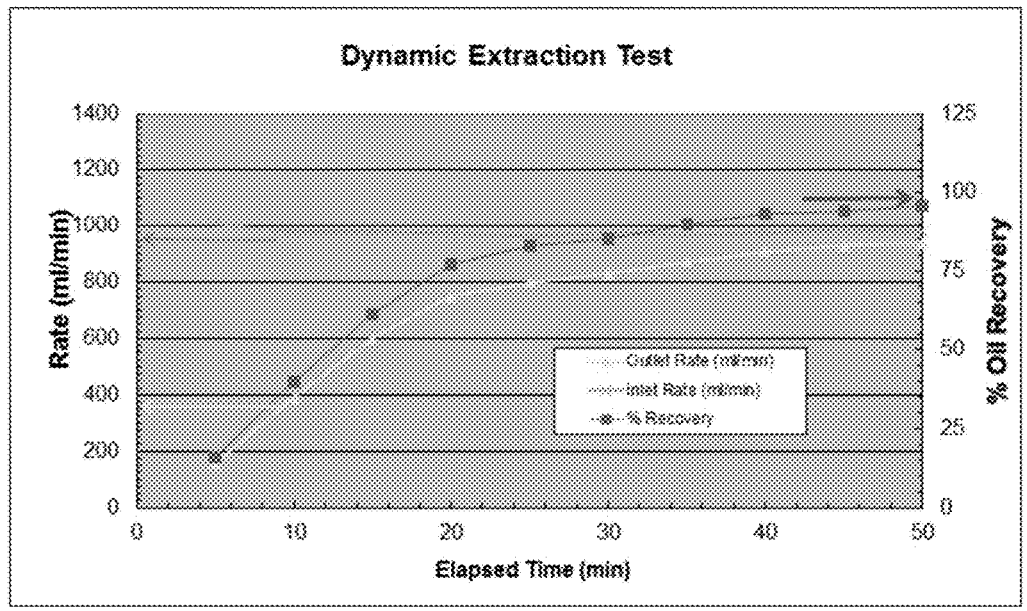
FIG. 13 is an example of oil/water separation from a ~12% oil in water mixture without a recovery fluid.

FIG. 13 is a graph that shows the test results from the recovery of oil from a mixture created to test for oil recovery in the absence of recovery fluid at constant pressure. Briefly, 980 mL of oil (isopar L) was injected per minute into a stream of water flowing at 2 gpm. Oil volume was recovered directly from the tube side outflow and the volume of oil recovered was measured at 5 min intervals.

Figure 14:
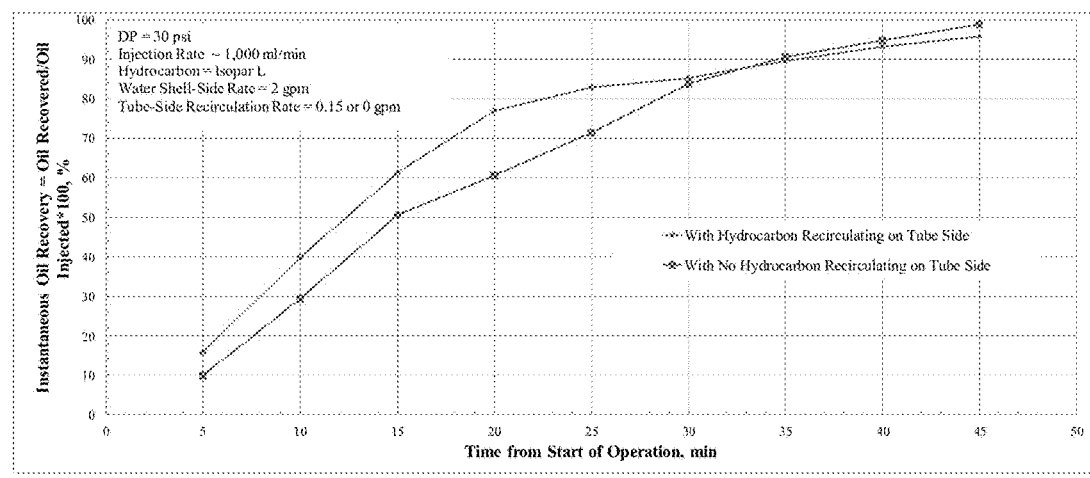
FIG. 14 is a comparison of oil/water separation with and without a recovery fluid.

FIG. 14 is an example of oil/water separation from a ~12% oil in water mixture with and without a recovery fluid at constant pressure. 1000 mL of oil was injected into a water stream flowing at 2 gpm. Volumes of oil recovered were determined using a calibrated sight glass when recovery fluid was used, and by direct measurement of volume recovered from the tube side outflow when recovery fluid was not used. With recovery fluid, the instantaneous recovery is higher in the first minutes of operation.

Figure 15:
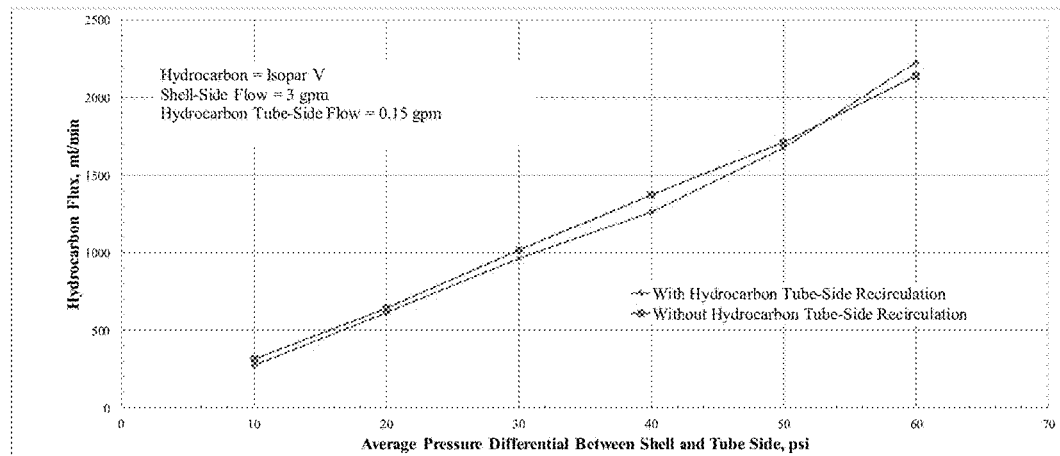
FIG. 15 is an example of oil flux through the tubes of the membrane with and without a recovery fluid.

FIG. 15 is a comparison of pure oil flux rates with and without a recovery fluid. In this study, the test ran at 3 gpm of oil (isopar V) on the shell side with the shell side outlet open. Volumes of oil recovered were determined using a calibrated sight glass when recovery fluid was used, and by direct measurement of volume recovered from the tube side outflow when recovery fluid was not used. This experiment also shows the approximately linear relationship between pressure and flux, in which the flux rate increases with increasing pressure.

Figure 16:
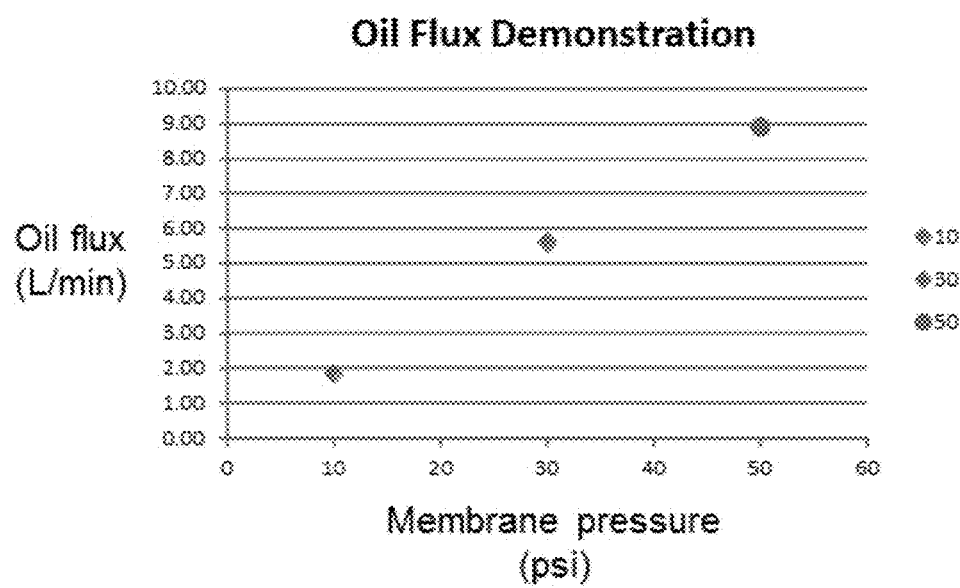
FIG. 16 is an example of the relationship between pressure and flux rate for oil.

FIG. 16 is an example of oil flux with and without a recovery fluid. This test demonstrates the flux of pure oil (isopar L) as a function of pressure in the absence of a recovery fluid. For the 10 and 30 psi points, isopar L was circulated at ~3 gpm on the shell side of the membrane. Oil volume was recovered directly from the tube side outflow. The test proceeded until 4 L of oil was recovered from the tube side. For the 50 psi dataset, the shell side outflow was capped, forcing the oil to pass through to the tube side. The test proceeded until 4 L of oil was recovered from the tube side. The average flux rate of duplicate runs is shown.

When considered with the previous figure, this test shows that the viscosity of the oil is a variable in the flux rate. For example, isopar L fluxed at a rate of about 5.5 L per min through the membrane at 30 psi. By contrast, the flux rate of isopar V at 30 psi was about 1 L per min in the previous test. The difference in flux rates is directly related to the viscosity of the oils; isopar V (~17 cSt) is significantly more viscous than isopar L (~2 cSt) and fluxes more slowly at identical operating conditions.

Figure 17:
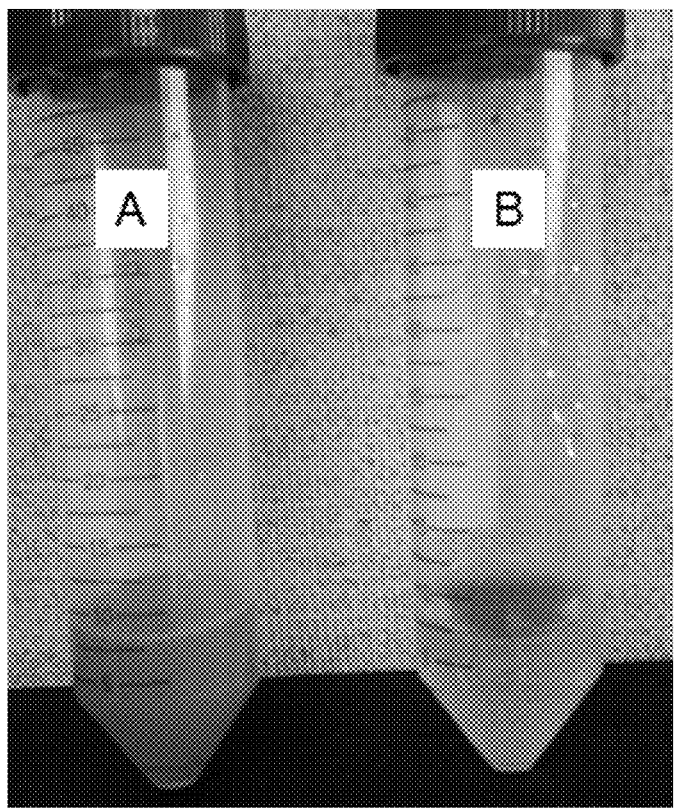
FIG. 17 is an example of oil removal from oilfield waste water without a recovery fluid.

FIG. 17 is an example of oil recovery from wastewater. Approximately 5 gallons of oil field wastewater containing light oils and solids of unknown composition was passed through the contactor to remove the oil. A recovery fluid was not used. The material was circulated through a 2.5 inch diameter membrane approximately 10 times with a 30 psi pressure differential. At the conclusion of the test, the shell side effluent (A) still contained the solids. A quantity of oil was recovered from the tube side (B).

Figure 18A:
FIGS. 18A and 18B are examples of water exclusion from oil.
Figure 18B:
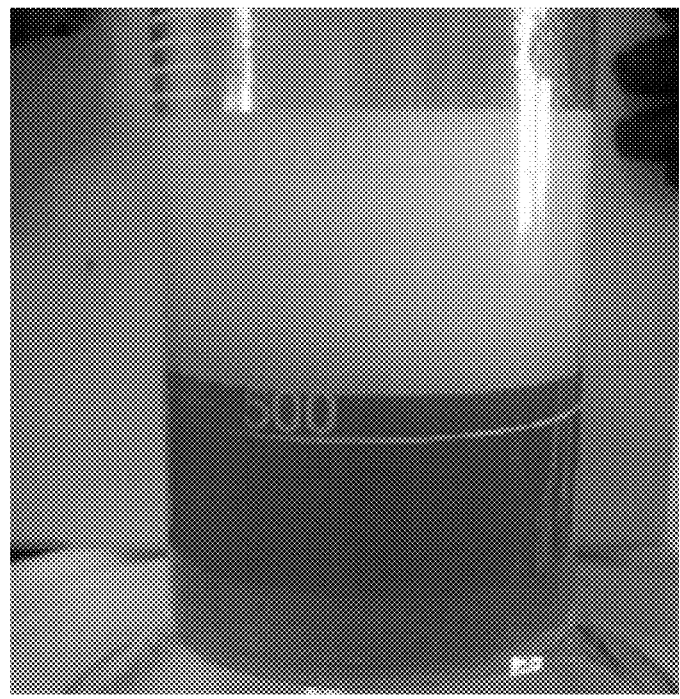

FIGS. 18A and 18B are examples of water exclusion from oil without a recovery fluid. Approximately 19 liters of isopar L was mixed with 1 liter of water and circulated repeatedly through a pump to create an emulsion (FIG. 18A, on left). This mixture was passed through a 4 inch diameter membrane to exclude the water. The shell side inlet pressure was 25 psi and a recovery fluid was not used. Oil volume was recovered directly from the tube side outflow. The test was stopped once 14 L isopar L was collected from the tube side outflow (FIG. 18A, on right). Alternately, the water exclusion process can be run with the shell side outflow capped; in this case, excluded water accumulates in the shell side of the membrane. FIG. 18B shows a sample of the remaining volume from the shell side of the membrane from a similar demonstration; water is on the bottom and remaining water/oil emulsion is on the top.

It will be understood by the skilled artisan that the process described hereinabove is applicable broadly for insoluble oil recovery beyond algae to include protists, fungi, yeast, *E. coli*, etc., mixed cultures of cells, grown by any method (not limited to photosynthetic organisms), aqueous slurries or aqueous mixtures containing broken and/or live cells or no cells (in case pre-treated to remove cells/cell debris or other suspended materials). The process can also be used to recover oil from any liquid source comprising insoluble oils for e.g. industrial water, brine, wastewater, industrial or natural effluents, water-oil mixtures, aqueous slurries, aqueous slurries comprising broken cells, live cells or combinations thereof, bio-cellular mixtures, lysed cellular preparations, and combinations thereof. The process of the present invention is capable of recovering almost up to a 100% of the one or more insoluble oils in the liquid source. The process provides insoluble oil recoveries of 45%, 50%, 55%, 60%, 65%, 70%, 75%, 80%, 85%, 90%, 95%, 98%, 99% and 100% from the liquid source.

The method and the process of the present invention can be expanded for recovery of a variety of molecules depending upon choice of recovery fluid and to include single or multi-step, differential recovery processes for e.g., specifically recover non-polar oil with one membrane module, then treat the effluent with a second membrane module employing a different recovery fluid. The recovery fluids may be selective, partially selective or non-selective for specific compounds. In other specific examples, the present invention may be used to specifically recover non-polar oil with one membrane module, then followed by treatment of the effluent from the first module with a second membrane module employing a different recovery fluid.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

U.S. Pat. No. 4,439,629: Extraction Process for Beta-Carotene.
U.S. Pat. No. 5,378,639: Solvent Extraction.

What is claimed is:

1. A method of recovering one or more insoluble oils from an aqueous mixture using one or more membrane contactors, comprising the steps of:
pumping, from a growth environment, the aqueous mixture comprising the one or more insoluble oils into contact with a first surface of the one or more membrane contactors, wherein the aqueous mixture does not contain an amount of solvent sufficient to disperse the insoluble oils, and wherein the aqueous mixture comprises one or more organisms that include at least one of intact cells, lysed cells, apoptotic cells, necrotic cells, wherein the aqueous mixture comprises two or more different organisms, wherein the aqueous mixture comprises a yeast, algae or bacteria, or wherein the aqueous mixture comprises organisms capable of secreting oil or causing accumulation of oil outside living cells;
coalescing the one or more insoluble oils from the aqueous mixture onto the first surface of the one or more membrane contactors, wherein the one or more membrane contactors are filed with a recovery fluid coalescing the one or more insoluble oils;
collecting a stream of coalesced insoluble oil from a second surface of the one or more membrane contactors, wherein the stream comprises coalesced insoluble oil and the recovery fluid; and
returning the aqueous mixture to the growth environment after the one or more insoluble oils are separated from the aqueous mixture.

2. The method of claim 1, wherein the aqueous mixture is subjected to the pumping within 1, 2, 4, 6, 8, 12, 24, 26, 48 or 72 hours from production.

3. The method of claim 1, wherein the aqueous mixture comprises one or more organisms that are genetically modified to render them capable of secreting hydrophobic components, one or more organisms that are capable of causing accumulation of the hydrophobic components outside living cells, or one or more organisms that are capable of causing accumulation of the hydrophobic components outside living cells upon induction with one or more chemical probes, exogenous agents, or pharmaceuticals, or combinations thereof.

4. The method of claim 1, further comprising:
contacting the one or more organisms with chemical probes, exogenous agents, or pharmaceuticals, whereby a metabolism of the one or more organisms is modified, and wherein at least one organism causes accumulation of the one or more insoluble oils outside living cells.

5. The method of claim 1, wherein 45%, 50%, 55%, 60%, 65%, 70%, 75%, 80%, 85%, 90%, 95%, 98%, 99% or 100% of the one or more insoluble oils in the aqueous mixture are recovered.

6. The method of claim 1, wherein returning the aqueous mixture to the growth environment includes returning the one or more organisms to the growth environment to for oil production.

7. The method of claim 1, wherein the one or more membrane contactors comprise a material selected from at least one of polyethylene, polypropylene, polyolefins, polyvinyl chloride (PVC), amorphous Polyethylene terephthalate (PET), polyolefin copolymers, poly(etheretherketone) type polymers, surface modified polymers, or surface modified polymers comprising polymers modified chemically at one or more halogen groups by corona discharge or by ion embedding techniques.

8. The method of claim 1, wherein the stream comprising the coalesced insoluble oil and the recovery fluid is not counterflowing.

9. The method of claim 1, wherein the recovery fluid comprises previously coalesced insoluble oil.

10. A method of recovering one or more insoluble oils from an aqueous mixture using one or more membrane contactors, comprising the steps of:
pumping the aqueous mixture comprising the one or more insoluble oils into contact with a first surface of the one or more membrane contactors, wherein the aqueous mixture does not contain an amount of solvent sufficient to disperse the insoluble oils and
wherein the aqueous mixture comprises one or more organisms that include at least one of intact cells, lysed cells, apoptotic cells, necrotic cells, or
wherein the aqueous mixture comprises two or more different organisms, wherein at least one of the organisms produces oil, or
wherein the aqueous mixture comprises a yeast, algae or bacteria, or
wherein the aqueous mixture comprises organisms capable of secreting oil or causing accumulation of oil outside living cells, or
wherein the aqueous mixture comprises one or more organisms that are genetically modified to render them capable of secreting hydrophobic components, or
wherein the aqueous mixture comprises one or more organisms that are capable of causing accumulation of the hydrophobic components outside living cells, or
wherein the aqueous mixture comprises one or more organisms that are capable of causing accumulation of hydrophobic components outside living cells upon induction with one or more chemical probes, exogenous agents, or pharmaceuticals, or combinations thereof;
coalescing the one or more insoluble oils from the aqueous mixture onto the first surface of the one or more membrane contactors, wherein the one or more membrane contactors are filled with a recovery fluid coalescing the oils; and
collecting a stream of coalesced insoluble oil from a second surface of the one or more membrane contactors, wherein the stream comprises coalesced insoluble oil and the recovery fluid.

11. The method of claim 10, further comprising:
contacting the one or more organisms with chemical probes, exogenous agents, or pharmaceuticals, whereby a metabolism of the one or more organisms is modified, and wherein at least one organism causes accumulation of the one or more insoluble oils outside living cells.

12. The method of claim 10, wherein the stream comprising the coalesced insoluble oil and the recovery fluid is not counterflowing.

13. The method of claim 10, wherein the recovery fluid comprises previously coalesced insoluble oil.

14. A method of recovering one or more insoluble oils from an aqueous mixture using one or more membrane contactors, comprising the steps of:
- pumping the aqueous mixture comprising the one or more insoluble oils from a growth environment for organisms including algae, bacteria or yeast, wherein the aqueous mixture does not contain an amount of solvent sufficient to disperse the insoluble oils;
- contacting a first surface of the one or more membrane contactors with the aqueous mixture, wherein the aqueous mixture comprises a growth media and the one or more insoluble oils produced by the growth environment;
- coalescing the one or more insoluble oils from the aqueous mixture onto the first surface of the one or more membranes or membrane contactors, wherein the one or more membrane contactors are filled with a recovery fluid coalescing the one or more insoluble oils;
- removing a first stream from the one or more membrane contactors, wherein the first stream comprises the growth media and organisms, wherein the organisms can continue to produce the one or more insoluble oils; and
- removing a second stream from a second surface of one or more membrane contactors, wherein the second stream comprises the one or more insoluble oils and the recovery fluid.

15. The method of claim 14, further comprising feeding or pumping the first stream to the growth environment to for oil production by the organisms.

16. The method of claim 14, wherein the one or more membrane contactors comprise a material selected from at least one of polyethylene, polypropylene, polyolefins, polyvinyl chloride (PVC), amorphous Polyethylene terephthalate (PET), polyolefin copolymers, poly(etheretherketone) type polymers, surface modified polymers, or surface modified polymers comprising polymers modified chemically at one or more halogen groups by corona discharge or by ion embedding techniques.

17. The method of claim 14, wherein the second stream comprising the one or more insoluble oils and the recovery fluid is not counterflowing.

18. The method of claim 14, wherein the recovery fluid comprises previously coalesced insoluble oil.

* * * * *